US012596999B2

(12) United States Patent
Minor

(10) Patent No.: US 12,596,999 B2
(45) Date of Patent: Apr. 7, 2026

(54) SYSTEM AND METHOD FOR CONVERTING CRYPTOCURRENCY TO VIRTUAL ASSETS WHOSE VALUE IS SUBSTANTIATED BY A RESERVE OF ASSETS

(71) Applicant: Uphold Global Foundation, Marbella (PA)

(72) Inventor: Halsey Mclean Minor, Beverly Hills, CA (US)

(73) Assignee: Uphold Global Foundation, Marbella (PA)

( * ) Notice: Subject to any disclaimer, the term of this patent is extended or adjusted under 35 U.S.C. 154(b) by 385 days.

(21) Appl. No.: 17/516,617

(22) Filed: Nov. 1, 2021

(65) Prior Publication Data

US 2022/0051201 A1 Feb. 17, 2022

Related U.S. Application Data

(63) Continuation of application No. 14/712,319, filed on May 14, 2015, now Pat. No. 11,164,164.

(60) Provisional application No. 61/993,797, filed on May 15, 2014.

(51) Int. Cl.
*G06Q 20/06* (2012.01)
*G06Q 20/36* (2012.01)
*G06Q 20/38* (2012.01)

(52) U.S. Cl.
CPC ......... *G06Q 20/06* (2013.01); *G06Q 20/3678* (2013.01); *G06Q 20/381* (2013.01)

(58) Field of Classification Search
CPC .. G06Q 20/06; G06Q 20/3678; G06Q 20/381; H04L 9/50; H04L 2209/56
See application file for complete search history.

(56) References Cited

U.S. PATENT DOCUMENTS

| | | | |
|---|---|---|---|
| D797,138 S | 9/2017 | Reiter et al. | |
| D797,144 S | 9/2017 | Bhandari et al. | |
| D860,256 S | 9/2019 | Stephen | |
| D879,145 S | 3/2020 | Connor et al. | |
| D905,105 S | 12/2020 | Connor et al. | |
| 11,062,278 B1 * | 7/2021 | Kurani .................. | G06Q 20/10 |
| 12,136,073 B1 * | 11/2024 | Kurani .................. | G06Q 20/10 |
| 2010/0153239 A1 * | 6/2010 | Liebich .................. | G06Q 10/00 705/30 |
| 2010/0311466 A1 * | 12/2010 | Wilson ................. | G06Q 20/354 235/492 |

(Continued)

*Primary Examiner* — Yingying Zhou
(74) *Attorney, Agent, or Firm* — Foley & Lardner LLP

(57) ABSTRACT

A computer-based system converts cryptocurrency into a virtual asset. The system includes a user account database server configured to store data of a plurality of user accounts. The stored data pertains to each user account and indicates an accounting of obligations of the system to the user. The system also includes a cryptocurrency account server configured to receive, from a networked device of a user, a transfer of crypto currency, from an external cryptocurrency account. In response to receipt of such a transfer, the cryptocurrency account server is configured to update the data pertaining to the obligations of the system to the user. The system also includes a user interface server configured to receive a request from the user for conversion of cryptocurrency to an asset. In response to receipt of the request, the system updates the data pertaining to the user account of the user.

16 Claims, 16 Drawing Sheets

(56)  References Cited

U.S. PATENT DOCUMENTS

| | | | | |
|---|---|---|---|---|
| 2012/0330844 A1* | 12/2012 | Kaufman | ............... | G06Q 20/14 |
| | | | | 705/67 |
| 2013/0024395 A1 | 1/2013 | Clark et al. | | |
| 2013/0065670 A1 | 3/2013 | Michaelson et al. | | |
| 2015/0066728 A1* | 3/2015 | Newall | ................ | G06Q 20/381 |
| | | | | 705/37 |
| 2015/0073961 A1* | 3/2015 | Cristoforo | ........... | G06F 3/04815 |
| | | | | 705/37 |
| 2015/0170112 A1* | 6/2015 | DeCastro | ............. | G06Q 20/367 |
| | | | | 705/39 |
| 2015/0262140 A1* | 9/2015 | Armstrong | ......... | G06Q 20/3829 |
| | | | | 705/41 |
| 2015/0262168 A1 | 9/2015 | Armstrong | | |
| 2015/0262173 A1 | 9/2015 | Durbin et al. | | |
| 2015/0287140 A1 | 10/2015 | Wang et al. | | |
| 2015/0317737 A1* | 11/2015 | Wallace | ................. | G06Q 40/06 |
| | | | | 705/36 R |
| 2015/0324764 A1* | 11/2015 | Van Rooyen | .......... | G06Q 20/02 |
| | | | | 705/69 |
| 2016/0260169 A1* | 9/2016 | Arnold | ................. | G06Q 20/381 |

* cited by examiner

300

Communications between an external cryptocurrency address and a sub-account of a user User Interfaces during a transfer of cryptocurrency external to the system to a sub-account of a user holding cryptocurrency Graphical User Interfaces for transfer of cryptocurrency from a subaccount of a user to a source external to the System

1 BTC 1.0001 BTC

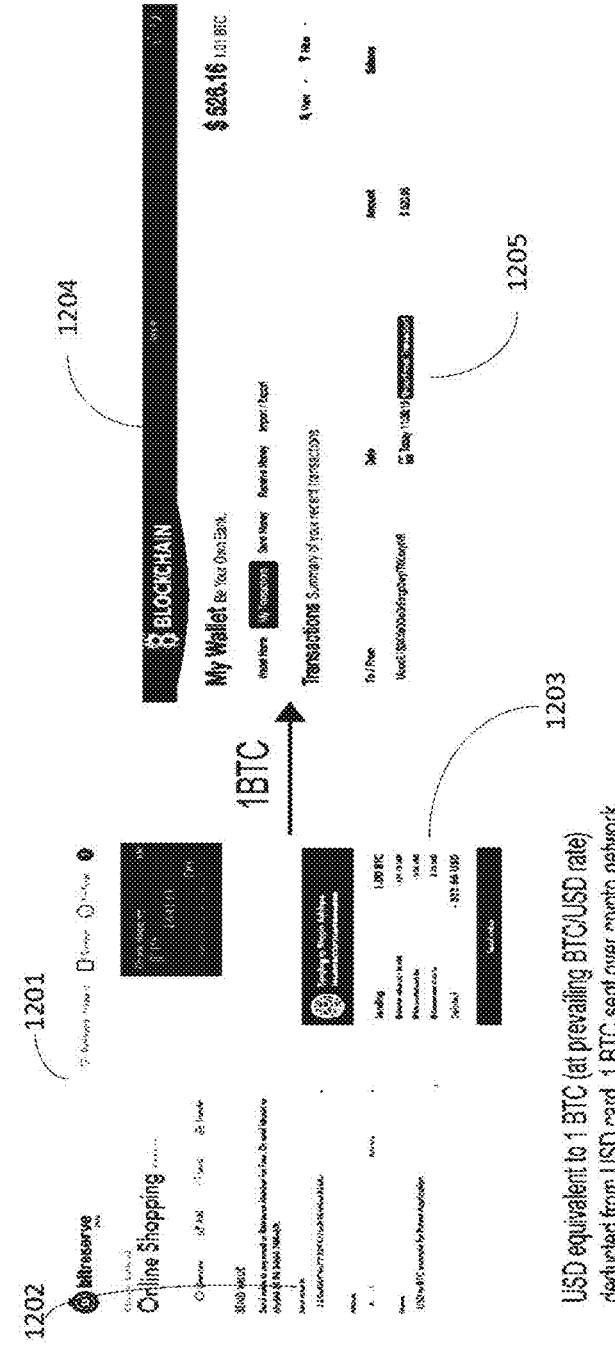

User Interface during a transaction between a System Account transferring cryptocurrency to an external account wherein the Account stores value as virtual dollars 1 bitcoin sent from a USD card to a bitcoin address outside Bitreserve (a Blockchain.info wallet).

USD equivalent to 1 BTC (at prevailing BTC/USD rate) deducted from USD card. 1 BTC sent over crypto network.

*Fig. 12*

Figure 13:
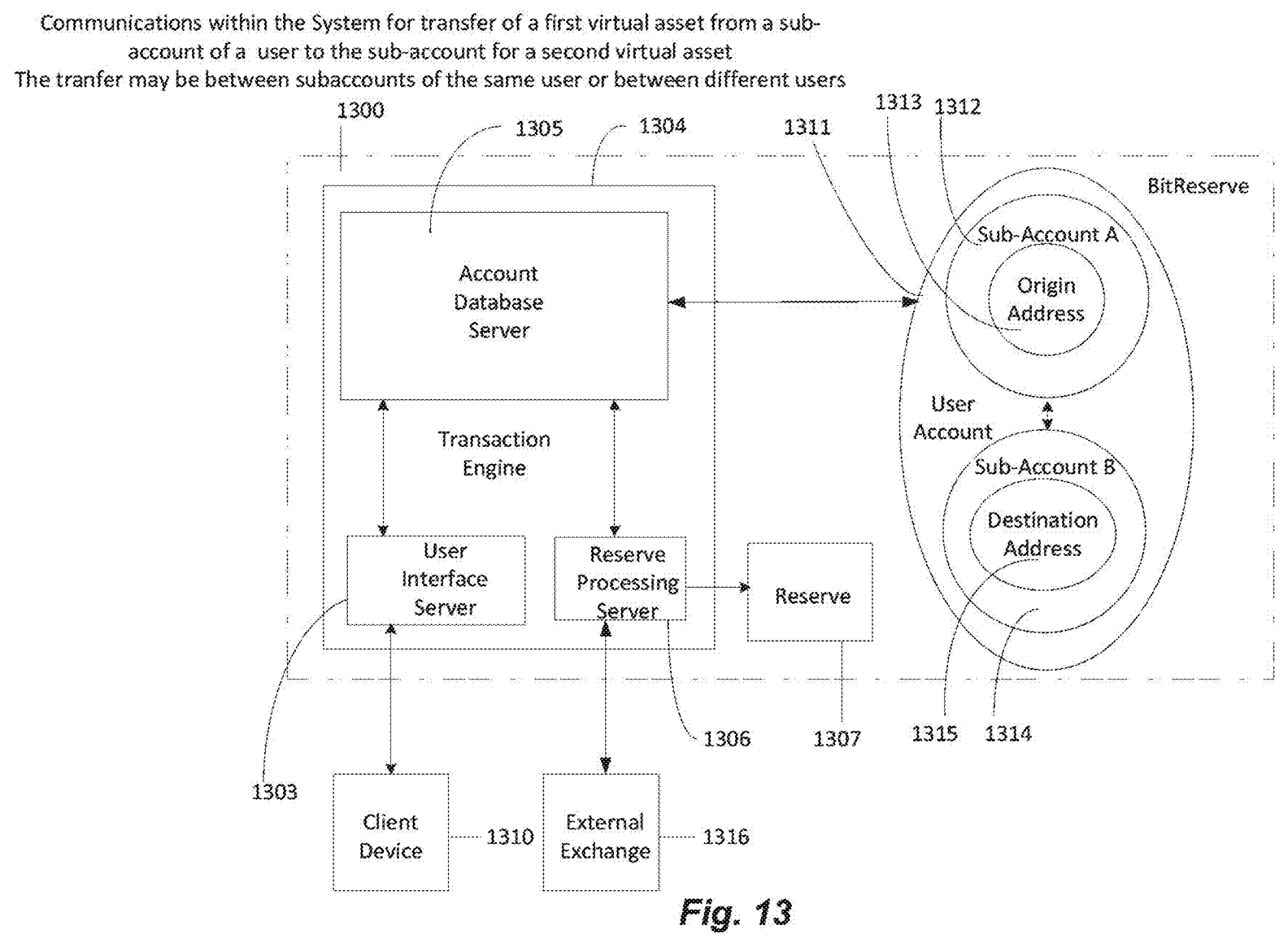

Communications within the System for transfer of a first virtual asset from a sub-account of a user to the sub-account for a second virtual asset
The tranfer may be between subaccounts of the same user or between different users BitReserve Sub-Account A Origin Address Sub-Account B Destination Address User Account 1313 1312

1311

1315 1314

Reserve

1307

Account Database Server

Transaction Engine

Reserve Processing Server

1306

User Interface Server

External Exchange 1316

Client Device 1310

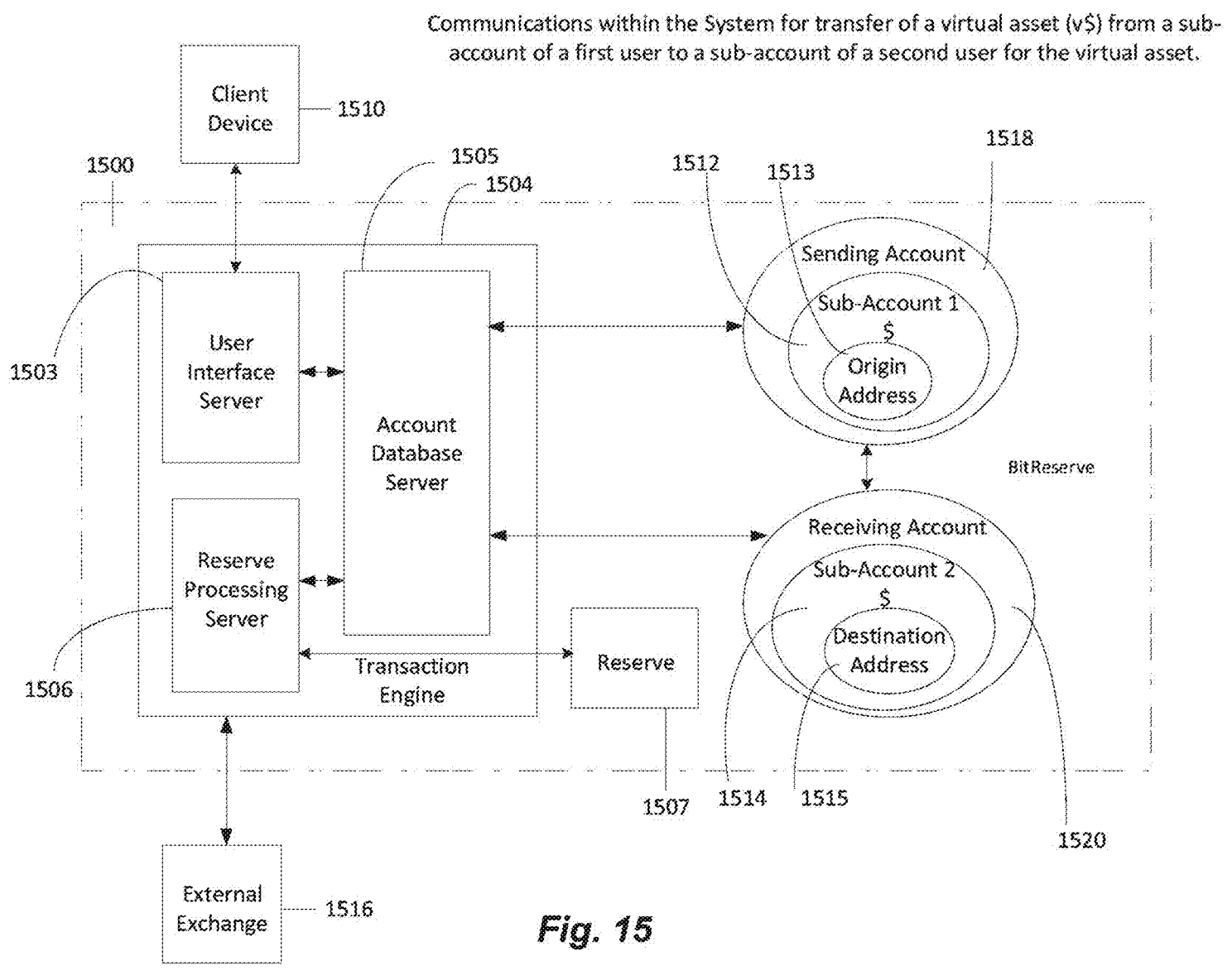

Communications within the System for transfer of a virtual asset (v$) from a sub-account of a first user to a sub-account of a second user for the virtual asset.

*Fig. 15*

Communications within the System for transfer of a first virtual asset (v$) from a sub-account of a first user to a sub-account of a second user for a second virtual asset (vYEN).

SYSTEM AND METHOD FOR CONVERTING CRYPTOCURRENCY TO VIRTUAL ASSETS WHOSE VALUE IS SUBSTANTIATED BY A RESERVE OF ASSETS

PRIORITY

This patent application is a continuation application of U.S. patent application Ser. No. 14/712,319, filed May 14, 2015, which claims priority from provisional U.S. patent application No. 61/993,797, filed May 15, 2014, each of which is incorporated herein, in its entirety, by reference.

TECHNICAL FIELD

The present invention relates to cryptocurrency, and more particularly to a system and method for the conversion of cryptocurrency into virtual assets accessible via networked device whose value (i.e. the "virtual assets" value) is substantiated by a reserve of assets.

BACKGROUND ART

Cryptocurrency is a decentralized system that enables the storing, accounting, and transfer of digital value. Cryptocurrency ownership is defined by an amount of cryptocurrency located at a digital public address that is accessible via a networked device. Cryptocurrency public addresses have an associated private key that allows for the transfer of value from that address via the cryptocurrency's decentralized digital accounting ledger. For example, Bitcoin is a cryptocurrency that uses Bitcoin as its unit of value denomination and the Bitcoin network as the mechanism for Bitcoin-denominated value transfer. Amounts of Bitcoin and their location on the Bitcoin network (their address) are registered in a digital public ledger accessible via the networked device. The private key associated with any Bitcoin address is required for the transfer of Bitcoin from that address to another Bitcoin address. Any transfer of Bitcoin from one address to another is only valid once confirmed by 51% of the participants in the transaction confirmation process that validates and represents the authority for the Bitcoin network's decentralized public ledger. Participants in the transaction confirmation process are rewarded for their work in updating the decentralized public ledger of cryptocurrency ownership to account for new Bitcoin transfers. In the case of Bitcoin, they are rewarded with Bitcoin, which is how Bitcoin (the unit of value) is produced. Other cryptocurrencies are "pre-mined" and the participants in the maintenance of the decentralized ledger are rewarded with fees paid in the cryptocurrency by the entity that "pre-mined" the cryptocurrency in question. Cryptocurrency can have a fixed number of units of the currency that will ever be in existence or may have a known rate of production of the number of new units of the cryptocurrency or may be a combination in which the rate of production is known and there is a fixed number of total units of the currency that will ever be produced.

Cryptocurrency is highly volatile compared to other stores of value because, unlike other assets, cryptocurrency has no underlying value, be it a relationship to a nation's economy (fiat currency), an earnings stream (stocks and bonds), or value to end consumers (commodities). Although volatile relative to assets such as fiat currency, because it is cloud-based and digital, cryptocurrency has the benefit of being a relatively fast and low-cost way to transfer value, especially compared to traditional value transfer mechanisms, such as credit and debit cards, checks, and bank transfers (wire, ACH, SEPA, etc.). This is because cryptocurrency-based value transfers do not require processing by the inefficient systems that connect financial institutions, such as banks. Except for direct (hand-to-hand) money transfers, transfers of fiat currency and other assets require validation, accounting, and/or processing by two or more financial institutions. The benefits of cryptocurrency (bypassing intermediaries and the costs and delays associated with using them), however, are largely nullified by its volatility relative to fiat currency.

Due to this volatility problem, value transfers using cryptocurrency can end up costing much more than bank wire transfer fees. Merchants accepting cryptocurrency for payment can end up paying much more than the fees and commissions charged by credit card companies to process fiat currency payments. Because of their unpredictable and rapid changes in value relative to fiat currency, cryptocurrencies have not been as widely adopted as a means for transferring value or exchanging value for real-world goods and services (e.g. food, transportation, clothing etc.) or other assets. The inherent volatility of cryptocurrency has not yet been addressed and systems and methods for making cryptocurrency useful for commerce are needed before cryptocurrency can be adopted by the mass market of consumers, merchants, and banks.

In addition to cryptocurrency's volatility, there are two other impediments to its mass-market adoption: 1. the time it takes a cryptocurrency's decentralized validation authority to confirm the transfer of value and 2. the inherent strangeness of a new currency for the average non-technical consumer. For example, Bitcoin transfers can take up to two hours before they are validated and confirmed, making Bitcoin useless for many commercial applications. The second impediment is cultural-money is as much a part of culture as language, and the average consumer feels uncomfortable operating in any currency other than the one with which they are familiar. Cryptocurrency's adoption as a way to lower the cost of moving value for the average consumer and lowering payment processing costs for the average merchant depend on new systems and methods that address cryptocurrency's inherent volatility, slow processing speed, and strangeness.

SUMMARY OF THE EMBODIMENTS

In a first embodiment of the invention there is provided a system that allows for the instant conversion of cryptocurrency to virtual assets (and vice versa), the value of such virtual assets being substantiated by a full reserve of assets. A virtual asset is a digital representation of an asset in the system (e.g., virtual USD). In some embodiments, the aggregate of all virtual USD enabled by the system at any given time is equaled or exceeded by actual USD held in the system's reserve. The system also allows for the instant transfer of the virtual assets it enables and of cryptocurrency among users of the system, as compared to the delays associated with transferring cryptocurrency via cryptocurrency networks and the delays associated with transferring assets (i.e., fiat currency, securities, and commodities) between traditional financial intermediaries, such as banks. A user of the system registers for an account and transfers cryptocurrency to the account using the cryptocurrency's addressing protocol. The cryptocurrency is transferred between a cryptocurrency address whose private key is controlled by the user to a cryptocurrency address associated with a sub-account in the user's account within the system, the sub-account having a private key controlled by the system. Each sub-account is denominated either as cryptocurrency or as a traditional asset class (e.g., fiat currency, security, commodity). The user's account in the system is represented on the user interface as a wallet with multiple sub-accounts represented by cards, with each card denominated either as cryptocurrency or as a traditional asset class, and with each sub-account (card) having one or more cryptocurrency addresses associated with it. Cryptocurrency sent directly to an asset-denominated (as opposed to a cryptocurrency-denominated) card may, once the transfer is confirmed by the cryptocurrency network, be converted by the system's transaction engine into the virtual asset of the card's asset denomination at the prevailing cryptocurrency/asset conversion rate. For example, a user of the system might send a Bitcoin from a Bitcoin address outside the system to the Bitcoin address associated with a Yuan-denominated sub-account (card) in his account. Once the transfer has been validated by the Bitcoin network's decentralized ledger, the system would immediately convert the Bitcoin into a Yuan-denominated virtual asset at the prevailing Bitcoin/Yuan exchange rate, crediting the user's sub-account with the correct amount of Yuan. Subsequently, the system's transaction engine reallocates assets in the system's reserve to reflect the aggregate changes in virtual assets in the accounts of the system's users. For example, to reflect the above-described Bitcoin/Yuan transaction, the transaction engine might send Bitcoin to one or more exchanges to be converted into Yuan and send the proceeds of the Bitcoin/Yuan conversion to be deposited in the system's full reserve (held in one or more banks or other financial institutions).

A user of the system accesses his account through an interface accessible via the networked device and connects with the transaction engine that maintains an accounting of the account (and sub-accounts) for the user. A user may convert cryptocurrency to a virtual asset (e.g., virtual USD or virtual gold) by sending cryptocurrency to a non-cryptocurrency-denominated sub-account. Transfers of cryptocurrency between accounts or sub-accounts are instant within the system, compared to the significant delay experienced when transferring cryptocurrency between cryptocurrency addresses outside the system. A user may transfer cryptocurrency or virtual assets between other users of the system. In some embodiments of the invention, the user may only transfer virtual assets when operating inside of the system, from one account to another or from one sub-account to another. For example, within his account, a user may convert cryptocurrency to virtual assets by transferring cryptocurrency from a cryptocurrency-denominated sub-account to a virtual asset-denominated sub-account (or vice versa) and/or convert one denomination of virtual asset to another (e.g. convert virtual USD to virtual Euros by transferring USD from his USO-denominated sub-account to his Euro-denominated sub-account). A user may also transfer cryptocurrency or virtual assets to other users of the system. In some embodiments, assets (including non-cryptocurrency assets e.g. fiat currency) may be directly input and output from the system. In some other embodiments, however, the user may only transfer value into the system in the form of cryptocurrency and may only withdraw value from the system in the form of cryptocurrency, both input and output of value via the cryptocurrency's addressing protocol and subject to the cryptocurrency's decentralized transfer validation mechanism. In some embodiments, a user may not withdraw virtual assets from the system and cannot request to have virtual assets converted to non-cryptocurrency assets by the system, whereby the user would receive physical ownership of the asset. For example, a user with sub-account balances in Yuan, Euros, and USD, could not request or otherwise effectuate the withdrawal of Yuan, Euros, or USD from his account. Rather, the user would have to convert these virtual assets to cryptocurrency by transferring them to a sub-account denominated in cryptocurrency where they would be instantly converted by the system into cryptocurrency at the prevailing virtual asset/cryptocurrency exchange rate published by the system. Then the user could transfer the resulting cryptocurrency proceeds out of the system to a cryptocurrency address whose private key is not controlled by the system. Typically, a user of the system will have an external cryptocurrency wallet (containing cryptocurrency addresses whose private keys they control) for the input and/or withdrawal of cryptocurrency from the system, and will also have an account within the system (the in-system account may also have associated wallet software and generally will have sub-accounts embodied by cards denominated either in cryptocurrency or a traditional asset class).

The system is embodied in a networked environment, such as the Internet, and includes at least one central server that operates as the transaction engine for communicating between a plurality of users and one or more exchanges where cryptocurrency can be purchased and sold in exchange for fiat currency, as well as one or more exchanges where non-fiat assets can be purchased and sold in exchange for fiat currency. A user may be either an individual with an account in the form of a wallet or an entity, such as a merchant or bank that has an associated account within the system with many sub-accounts. The plurality of users interact with the transaction engine by requesting a user interface to be sent to a client device. The user interface may be a webpage that includes code (e.g. scripts or executable code) that establishes a secure connection to the transaction engine. The transaction engine may include one or more processors and will have an interface for interacting with a reserve of assets held in one or more banks or other financial institutions, an interface for interacting with each user, and an account manager that interacts with an account database. The account manager of the transaction engine maintains the status of the user's account and updates the account with any transfers/transactions of virtual assets between sub-accounts and/or transfers/transactions of cryptocurrency either external to the system or between sub-accounts within the system.

One or more exchanges provide for the purchase and sale of, respectively, cryptocurrency and assets that are held in the system's reserve of assets. An asset may be fiat currency, security (i.e., stock or bond), commodity, or a cryptocurrency. An exchange accepts fiat currency for the purchase of the asset or cryptocurrency. For example, exchanges include cryptocurrency exchanges, stock exchanges, commodity exchanges, currency exchanges, etc.

In some embodiments, the virtual assets are only transferable within the system, but are substantiated by a corresponding reserve of assets. As a result, if a user with an account sends one unit of cryptocurrency from a sub-account denominated in cryptocurrency to a USD-denominated sub-account and the prevailing exchange rate is USD500 per unit of cryptocurrency, the system will credit the sub-account with USD500, the transaction engine will perform an accounting and subtract the one unit of cryptocurrency from the sub-account of the user denominated in cryptocurrency and will subsequently interact with an exchange that converts cryptocurrency to USD. The transaction engine will exchange one unit of cryptocurrency for the equivalent amount of USD. The transaction engine then accounts for and deposits the USD in the system's reserve.

It should be understood that the system performs the accounting of transactions in users' accounts in real-time while the reallocation of assets in the reserve may be performed asynchronously via exchange operations.

The system's reserve may be a location or electronic account that maintains the reserve's assets. For example, the reserve assets of the system could include fiat currency held in a bank account, or securities and commodities held in a brokerage account, or physical precious metals, and/or fiat currency bank notes held in a vault. The assets in the system's reserve differ from the virtual assets credited by the system to its users' accounts in that the assets in the reserve have value outside the system whereas the virtual assets in users' accounts only have value within the system. Users can convert cryptocurrency into a virtual asset that is backed by an equivalent amount of asset of the same denomination in the reserve. For example, assuming a Bitcoin/USD exchange rate of USD500 per 1 BTC, a user can convert one Bitcoin into USD500 on his USO-denominated card by transferring one Bitcoin to the USO-denominated sub-account (card) in his account. This request is transferred through the user interface to the transaction engine that credits US0500 to the USO-denominated sub-account. Subsequently, the transaction engine executes a reallocation of assets in the system's reserve, selling one Bitcoin at an exchange and depositing the proceeds in the system's reserve. In this example, the exchange is a Bitcoin/fiat (USO) exchange. A user may also convert one virtual asset into another virtual asset, by transferring value from one asset-denominated sub-account (card) in his wallet to another sub-account (card) denominated in a different asset. For example, a user may transfer value from his USO-denominated sub-account to his Yen-denominated sub-account. This request is transferred through the user interface to the transaction engine that debits the requested amount from the USO-denominated card and credits an amount of Yen to the Yen-denominated card at the system's prevailing exchange rate. Subsequently, the transaction engine executes a reallocation of assets in the system's reserve, selling USO for Yen at an exchange. In this example, the exchange is a fiat currency exchange. Assuming a 100:1 Yen/USO exchange rate, the transaction engine withdraws US0300 from the system's reserve, transfers the US0300 to the fiat currency exchange account, exchanges the US0300 for 30,000 Yen, and transfers the 30,000 Yen to the system's reserve.

In some embodiments of the invention, each transaction by a user transferring value from his account to another user's account, or from one sub-account to another sub-account may not have an immediate corresponding asset reallocation transaction executed by the system's transaction engine via a currency exchange. Thus, the reallocation of assets in the reserve may be asynchronous with transfers and conversions of virtual assets in a user's account, due to efficiencies from batching and/or crossing transactions internally, so that asset reallocations in the reserve correspond to net aggregate transfers of virtual assets by all the systems' users. For example, if in a given rebalancing period some number of the system's users transfer an aggregate of USOI million to Bitcoin-denominated sub-accounts and during the same time period some number of the system's users transfer an aggregate of USO I million worth of Bitcoin to their USO-denominated sub-account, the system's transaction engine would not, based on the aforementioned transactions, reallocate USO or Bitcoin in the reserve.

The system can be used to transfer fiat currency-denominated value between buyers and sellers of a good or service. A user may wish to buy a good or service from a brick and mortar store or through an electronic commerce website. Merchants who also have an account in the system can receive payment in any fiat currency supported by the system from any user with an account in the system instantly and free-of-charge. The merchant's account in the system will be credited by the transaction engine for the price of the good or service being sold, and the purchaser's account will be debited by an equal amount.

A user account may have one or more sub-accounts. A user account may take the form of a digital wallet and a sub-account may take the form of a card denominated in either a traditional asset class or cryptocurrency. In some embodiments of the system, each subaccount is associated with one or more cryptocurrency addresses whose private keys the system controls.

The system includes an associated reserve, and the reserve holds an aggregate of assets equivalent to the total value of all of cryptocurrency and virtual assets held in all of the users' accounts and sub-accounts in the system. This system addresses the risk of loss of value due to cryptocurrency's volatility relative to an asset such as a fiat currency (e.g. USD, Yen, Yuan, etc.) because the user may instantly convert cryptocurrency to the virtual asset. Once converted to the virtual asset, the user is no longer exposed to the cryptocurrency's potentially value-destroying volatility, but may still participate in the cryptocurrency economy by instantly converting virtual asset back to cryptocurrency. Thus the system enables users to enjoy the benefits of cryptocurrency (relatively fast and low-cost value transfers) without being exposed to the risk of loss due to cryptocurrency volatility relative to traditional asset classes.

Assets held in the system's reserve are correlated to the cryptocurrency and virtual assets credited to users' sub-accounts, however, the users' of the system do not have any ownership claim on the assets held in the reserve. The system's transaction engine reallocates assets in the reserve to reflect transfers and conversions of cryptocurrency and virtual assets between users' sub-accounts and between users' accounts, as well as transfers of cryptocurrency into and out of the system, in order to maintain a correlation of virtual assets and cryptocurrency in users' accounts and assets in the system's reserve. This correlation substantiates the value of the virtual assets enabled by the system.

The transaction engine can receive as input cryptocurrency into a user's account and can automatically convert the cryptocurrency into a virtual asset associated with a corresponding sub-account of the user. In some embodiments of the invention, the user's account may be associated with a cryptocurrency address, such as a Bitcoin address.

The user interface that is provided to the user through a request to the transaction engine includes a graphical display that shows at least the amount of virtual assets within the user's account. In some other embodiments, the user interface also includes a total amount of cryptocurrency associated with the user's account. The user interface may include HTML code or another code type associated with the presentation of a webpage within a web browser program. The interface may include inputs for requesting a transfer of virtual assets or cryptocurrency between sub-accounts controlled by the user. The user interface provides inputs for requesting a transfer of virtual assets or cryptocurrency to a sub-account controlled by another user. The user interface provides inputs for requesting a transfer of cryptocurrency to cryptocurrency addresses outside the system.

The virtual assets in a sub-account may be transferred by a user to the sub-account of another user of the system as the same kind of asset held in the sub-account, or as any other class of asset. A virtual asset transferred from one sub-account to a sub-account corresponding to a different virtual asset will automatically be converted by the transaction engine to the type of virtual asset corresponding to the destination sub-account at the system's prevailing exchange rate, and this information will be updated in a record maintained for the account in an account database.

Assets held within the system's reserve may be crypto-currency/cryptocurrencies, currency/currencies (e.g. in digital form, held in accounts in the system's name at financial institutions such as banks or in physical form in vaults controlled by the system), commodity/commodities, and security/securities, or any combination thereof The transaction engine is in communication with the system's reserve. The reserve may be a physical location that stores assets or may be a computer system that keeps track of asset allocations (both withdrawals and deposits, as well as purchases and sales conducted on exchanges). The transaction engine coordinates the movement of assets into and out of the reserve. Movements of assets into and out of the reserve correlate to net aggregate movements of cryptocurrency and virtual assets into, within, and out of the system.

In accordance with one embodiment of the invention, a computer-based system converts cryptocurrency into a virtual asset. The system includes a user account database server configured to store data pertaining to a plurality of user accounts. The stored data pertains to each user account and indicates an accounting of obligations of the system to the user. The system also includes a cryptocurrency account server configured to receive, from a networked device of a user, a transfer of cryptocurrency from an external cryptocurrency account under control of the user. In response to receipt of such a transfer, the cryptocurrency accounts server is configured to update, in the user account of the user, the data pertaining to the obligations of the system to the user, based on the transfer of cryptocurrency. The system also includes a user interface server configured to receive a request from the user for conversion, to an asset, of cryptocurrency associated with the user account of the user, and in response to receipt of the request, to update the data pertaining to the user account of the user. The data is updated to indicate (a) a credit, of an obligation of the system to the user, for a virtual asset that corresponds to the asset, based on a prevailing exchange rate between the cryptocurrency and the asset, and (b) a debit, of an obligation of the system to the user, for the cryptocurrency, based on the prevailing exchange rate.

In accordance with one embodiment of the system, a reserve processing server performs a reserve rebalancing to cause assets held by a reserve to reflect the aggregate of virtual assets, indicated by data pertaining to the user accounts in the user account database server, after these data have been updated. The reserve processing server may perform the rebalancing by buying and selling assets and/or cryptocurrency at one or more external exchanges and returning proceeds to the reserve. In some embodiments, the cryptocurrency account server allows users to transfer only cryptocurrency into the system and transfer only cryptocurrency from the system.

In accordance with another embodiment of the system the user interface server is configured to receive a user request for transfer of virtual assets between a first user's account and a second user's account. In response, the user interface server debits the first user account and credits the second user account with the virtual assets by updating the user account database. The user interface server may be further configured to receive a user request for transfer of cryptocurrency to an external cryptocurrency address, and in response, (a) update the system's obligation in the user's account in accordance with the request and (b) transfer cryptocurrency from the cryptocurrency account server to the designated external cryptocurrency address.

In accordance with an embodiment of the system, the user account database server, the cryptocurrency account server, or the user interface server may include a plurality of processing devices.

In accordance with some embodiments of the system, cryptocurrency and/or assets are added to the reserve as the result of user requests. In some embodiments, the system may include a reserve database that provides an account of assets and cryptocurrency in the reserve including all transactions of assets into and from the reserve. The reserve rebalancing may be based in part upon a comparison of the account of assets and cryptocurrency in the reserve to an aggregation of virtual assets and cryptocurrency represented in user accounts in the user account database. The system may include an exchange processor in communication with a plurality of electronic exchanges.

In accordance with an embodiment of the invention, a computer-implemented method for converting cryptocurrency into a virtual asset within a system having a plurality of user accounts where users can only transfer cryptocurrency into and out of the system, receives, from a networked device of a user, a transfer of cryptocurrency, from a user cryptocurrency account under control of the user, into a cryptocurrency account server. In response to receiving the transfer of cryptocurrency, the data pertaining to a user account is updated in a user account database server to register a cryptocurrency obligation of the system to the user for the received cryptocurrency. A user transaction requested is received at a user interface server, from a user, to convert the cryptocurrency obligation of the system into an asset. In response to receiving the user request, the data in the user account is updated by debiting the cryptocurrency obligation and crediting a virtual asset obligation that corresponds to the asset, at a prevailing exchange rate. A reserve processing server is used to perform a reserve rebalancing to cause assets held by a reserve to reflect the aggregate of virtual assets indicated by data pertaining to the user accounts held in the plurality of user accounts within the system.

In some embodiments, rebalancing includes sending cryptocurrency from the cryptocurrency account server to an electronic external exchange for converting the cryptocurrency to an asset. The reserve receives the asset from the electronic external exchange and stores the asset in the reserve. In some embodiments, rebalancing the reserve assets reoccurs after receipt by the user interface server of a plurality of user transaction requests. In some other embodiments, rebalancing of the reserve assets reoccurs after a predetermined time period. In some embodiments, rebalancing the reserve assets includes sending assets from the reserve to an external exchange for converting the asset to cryptocurrency, and receiving cryptocurrency from the external exchange at the cryptocurrency account server.

In some embodiments, user account data is updated in real-time with respect to receipt of the request for a transaction. The cryptocurrency account server may provide a cryptocurrency transaction address that is associated with a sub-account of the user.

A reserve database including an account of assets and cryptocurrency may be maintained by the system. The cryptocurrency received at the cryptocurrency account server may be transferred to a reserve cryptocurrency account. Rebalancing the system may include comparing the account of assets and cryptocurrency in the reserve database to an aggregation of virtual assets and cryptocurrency indicated by data in user accounts in the user account database.

BRIEF DESCRIPTION OF THE DRAWINGS

The foregoing features of embodiments will be more readily understood by reference to the following detailed description, taken with reference to the accompanying drawings, in which:

FIG. 8 shows the graphical user interface presented to the user during the transaction of FIG. 7 in accordance with illustrative embodiments of the present invention;

FIG. 12 shows the user interfaces from the viewpoint of the user during the transaction of FIG. 11 in accordance with illustrative embodiments of the present invention;

FIG. 13 shows the communications that occur within the system when virtual assets from a first sub-account are sent to a second sub-account in accordance with illustrative embodiments of the present invention;

FIG. 15 shows the communications that occur within the system when a virtual asset from a first sub-account is sent to a second sub-account in accordance with illustrative embodiments of the present invention;

DETAILED DESCRIPTION OF SPECIFIC EMBODIMENTS

Definitions

Figure 1:
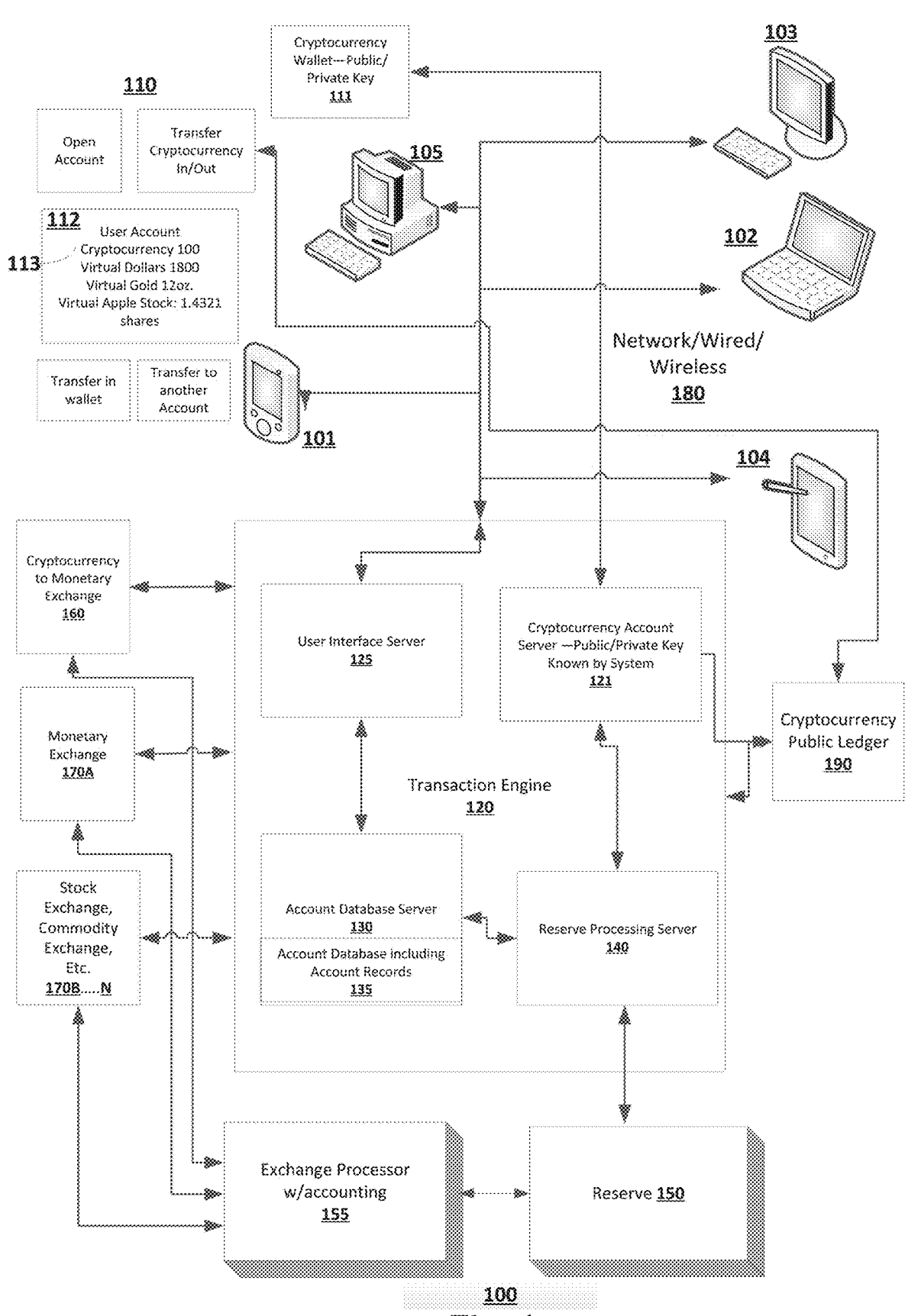
FIG. 1 schematically shows a logical view of an exemplary system that may be used in accordance with illustrative embodiments of the present invention.

As used in this description and the accompanying claims, the following terms shall have the meanings indicated, unless the context otherwise requires.

The term "cryptocurrency" shall refer to a digital medium of value exchange and representation of value that is not guaranteed by a central authority, such as a government.

Cryptocurrency is often characterized by the absence of a central issuing or validating authority and by the existence of a cloud-based public ledger accessible by networked device for accounting of value ownership and transfer. Although embodiments of the present invention as represented in the examples below may refer to Bitcoin as the cryptocurrency, it should be recognized that other cryptocurrencies may be substituted for Bitcoin. Some embodiments of the present invention apply to a variety of cryptocurrencies and are not limited to just Bitcoin.

The term "system" shall refer to the components in communication for the creation of a user account, updating each user account in response to a transaction, communicating with a reserve of assets, and performing transactions with third-party asset exchanges (e.g. Bitcoin to USD etc.).

The system may be composed of one or more servers and may be organized as a distributed system wherein functionality is logically separated and require one or more processing components. The system will include at least a transaction server and can also include a reserve server, one or more asset exchange servers, a user account server etc. The system may also include one or more data storage systems, such as, a user account database, a transaction database, and a reserve database "Internal cryptocurrency address" shall refer to a cryptocurrency address that is associated with sub-accounts of the system and whose private key is under the control of the system. "External cryptocurrency address" shall refer to a cryptocurrency address outside of the system whose private key is not controlled by the system.

A user of the system may control both an external cryptocurrency address and an account whose sub-accounts have cryptocurrency addresses associated with the system and whose private keys are controlled by the system. Cryptocurrency is input to an account within the system from the external cryptocurrency address.

In embodiments of the present invention, a user may create an account with the system and transfer cryptocurrency into the system to a cryptocurrency address whose private key is under the control of the system. As such, the cryptocurrency is no longer under the control of the end user, however, the system maintains an accounting of the inputted cryptocurrency.

A real-world "asset" shall refer to fiat currency (e.g. USD, Yen, Pounds etc.), a commodity (e.g. gold, silver, etc.), a security (i.e. an equity stake of ownership of a company) or bond (an instrument of indebtedness), or other known and accepted object having value for which there are exchanges through which the asset can be easily bought and sold in exchange for fiat currency.

A "virtual asset" shall refer to a representation of an asset in digital form that is associated with an account holder's sub-account.

The virtual asset or cryptocurrency is an obligation of the system operator to the account holder (a liability). The value of the virtual asset is substantiated by a reserve of assets where the assets in the reserve correspond to the aggregate of virtual assets in the system's users' accounts.

A "virtual asset holder" is a user having an account with one or more sub-accounts with a balance of virtual assets.

The term "association or associated" shall mean that there is a relationship between objects.

An association is not necessarily an indication of ownership. For example, a user may have a system account that is associated with cryptocurrency. The association does not necessarily indicate that the user owns the cryptocurrency. In some embodiments, the association is a representation of an obligation owed to the user by the system. In some embodiments of the invention, ownership of cryptocurrency that enters the system is transferred from the user to the system. Thus, the user's account is associated with cryptocurrency, the association of which may be referred to as virtual cryptocurrency. However, the system may own the cryptocurrency.

FIG. 1 schematically shows a logical view of an exemplary system 100 that may be used in accordance with illustrative embodiments of the present invention. As shown in FIG. 1, a user associated with a client device 101-105 establishes an account with the system. It should be obvious to one of ordinary skill in the art that a client device, such as 101-105 may be any communication device such as a cellular phone, computer, tablet etc. that can connect to a network and send and receive data. The client device 101-105 preferably includes a web browser and can display webpages and execute associated computer code. Preferably, the client device 101-105 may receive and transfer data between the client device 101-105 and the system 100, including at least a transaction engine 120.

The user may make a request to establish an account through the transaction engine 120. It should be understood by one of ordinary skill in the art that the transaction engine 120 may be composed of multiple processors. For example, the transaction engine 120 may include an account database server, an exchange server, a reserve server and other computer processing devices and storage systems. The transaction engine 120 includes a user interface server 125 that provides a user interface 110 through the client device 101-105. The user interface 110 allows for the secure transfer of information between the client device 101-105 of the user and the transaction engine 120. The user interface 110 may be provided in the form of a web page and associated code (e.g. Java, JavaScript). The user interface server 125 communicates with the client device 101-105 and an account database server 130 to create a user account 112. The account database server 130 stores the data pertaining to the user accounts 112. For example, data stored includes the user's account information in the account database 135. The account database server 130 also stores the user's access credentials for the user's account 112.

When the account 112 is created it has an initial nil value. After the user has set up an account 112, virtual sub-accounts 113 may be created. To access a user's account 112, the user makes a request to the transaction engine 120 that may be through a web browser. In some embodiments, creating an account 112 automatically establishes sub-accounts 113. In some other embodiments, a user may select to create new sub-accounts 113. As shown in FIG. 1, the user account 112 has a virtual cryptocurrency sub-account 113, a virtual dollars sub-account 113, a virtual gold sub-account 113 and a virtual apple stock sub-account 113. These sub-accounts 113 are illustrative and are not intended to limit the type or value of sub-accounts 113 of a user.

After an account 112 is created, a user can transfer or request a third party to transfer cryptocurrency into the user's account 112. Cryptocurrency may be transferred into the account 112 by sending cryptocurrency to the cryptocurrency address associated with the account 112 or the sub-account 113. The transferor has a cryptocurrency address outside the system whose private key is under the transferor's control. The transferor's cryptocurrency address is not associated with the system and therefore is an external address 111. The external address 111 provides the input of value into the system 100. The system 100 also outputs value to an external address 111. Inputs and outputs from the system 100 are in cryptocurrency. The transferred cryptocurrency is sent from the external address 111 to the transaction engine 120. The cryptocurrency is received by the cryptocurrency account server 121. The recipient's address associated with the system is an internal address and may include a user's account 112 address or sub-account 113 address.

The cryptocurrency sent in to the system 100 is eventually held in the system reserve 150. The transaction engine 120 includes a cryptocurrency account server 121 that receives the transfer of cryptocurrency from the external address 111. The cryptocurrency account server 121 communicates with a reserve processing server 140 included in the transaction engine 120. The cryptocurrency account server 121 notifies the reserve processing server 140, which manages the system reserve 150, of the incoming cryptocurrency. The reserve processing server 140 communicates with the reserve 150 and inputs the cryptocurrency into the reserve 150.

The cryptocurrency account server 121 also communicates with the account database server 130. The cryptocurrency account server 121 recognizes the internal account 112 address or the sub-account 113 address that the cryptocurrency is sent to. This data is sent to the account database server 130 which registers an obligation of the system 100 to the user account 112 for the transfer of cryptocurrency now held by the system 100 in the system reserve 150. The obligation may be represented as a virtual cryptocurrency in the user account 112. The transfer of cryptocurrency is established using the protocol known in the art for transferring cryptocurrency and the transaction may be established on a cryptocurrency public ledger 190. The public ledger 190 is associated with the transferred cryptocurrency and reflects the transfer from the external address 111 into the system 100 address. The process of updating the public ledger 190 may be time consuming. Because transferred cryptocurrency is held in the reserve and under the control of the system 100, the system 100 allows for instant internal transfers of cryptocurrency among users of the system 100 without having to update the public ledger 190. It should be clear that, in some embodiments, the user of the system 100 does not own any assets reflected by the user's account 112. These assets are held in the reserve 150 and owned by the system 100. In some embodiments, the user can only transfer cryptocurrency into and out of the system 100. However, not all embodiments are limited to transfers of cryptocurrency into and out of the system. The user can hold the value of the cryptocurrency in different virtual assets 113 within the system.

After the transfer of cryptocurrency into the system 100, the cryptocurrency is reflected as a virtual cryptocurrency asset. A user of the system may convert the virtual cryptocurrency to a different virtual asset within the user's account 112 (as a different sub-account 113). Client device 101 displays the user's account 112 information through a user interface 110. The user is provided with a plurality of options including opening a sub-account 113, transferring cryptocurrency into or out of the account 112, performing a transfer within a user account 112 between various virtual assets (e.g. between sub-accounts), and transferring either a virtual asset or cryptocurrency to another account holder of the system 100. The user interface 110, for example, shows that this user has 100 units of cryptocurrency and has already converted some of the initial cryptocurrency into a plurality of virtual assets that are stored in sub-accounts 113. As shown, the user account 112 contains 1800 virtual USD, 12 oz. of virtual gold, and virtual Apple stock equivalent to 1.4321 shares.

Virtual cryptocurrency may be converted by transferring virtual cryptocurrency from a cryptocurrency-denominated sub-account 113 to a sub-account 113 associated with the virtual asset. For example, a user may convert cryptocurrency to virtual USD ("United States Dollars"). This request causes the transaction engine 120 to send the request to the account database server 130. The transaction engine 120 is in communication with a number of exchanges. These exchanges includes a cryptocurrency to monetary exchange 160, a monetary exchange 170A, and multiple other exchanges 170B . . . N (e.g. stock exchange, commodity exchange). The account database server 130 updates the account 112 in real-time based upon the prevailing exchange rate obtained from one of the exchanges 160, 170A, 170B . . . N and the updated account is reflected on the display of the device (e.g. 101-105). The transfer from the virtual cryptocurrency-denominated sub-account 113 to another virtual asset sub-account 113 may be reflected in the reserve 150 assets. The reserve 150 assets are exchanged, to reflect the transfer of virtual assets, when the reserve processing server 140 performs an asset rebalancing.

The reserve processing server 140 performs a reserve rebalancing to cause assets held by the reserve 150 to reflect the aggregate of virtual assets. To that end, the account database server 130 communicates with the reserve processing server 140. This communication allows assets within the reserve to be bought and sold on the appropriate asset exchanges 160, 170A, 170B . . . 170N. The reserve processing server 140 may interact with the appropriate asset exchange to rebalance the assets held within the reserve 150 to reflect the accounts of the users of the system 100. The reserve processing server 140 performs an asset rebalancing based upon one or more transactions indicated by data pertaining to the user accounts 112 in the user account database server 130.

In a preferred embodiment, the reserve processing server 140 performs a single universal rebalancing for a pool of transactions. In practice, where there are many users that have accounts 112 within the system and many transactions that occur during any period of time, the reserve processor 140 will pool the transactions over a set period of time (e.g. seconds, minutes, every hour etc.), and the reserve processing server 140 then perform a global asset rebalancing based upon the total change in the assets as reflected by all of the pooled transactions for the set period of time. Thus, the rebalancing of the assets by the reserve processor 140 reflects global changes and the reserve processor 140 does not need to engage the exchange processor 155 and transact a trade that directly reflects every user transaction. The reallocation of assets in the reserve 150 occurs based upon the aggregate change in obligations that occur within the system 100.

The reserve 150 provides real world value for the virtual assets that are transferred. The account database server 130 provides an efficient and substantially instantaneous accounting when a user or users transfer value between sub-accounts 113 or between accounts 112. This system addresses the risk of loss of value due to cryptocurrency's volatility relative to an asset such as a fiat currency (e.g. USD, Yen, Yuan, etc.) because the user may instantly convert cryptocurrency to the virtual asset. Once converted to the virtual asset, the user is no longer exposed to the cryptocurrency's potentially value-destroying volatility, but may still participate in the cryptocurrency economy by instantly converting the virtual asset back to cryptocurrency. Thus the system enables users to enjoy the benefits of cryptocurrency (relatively fast and low-cost value transfers) without being exposed to the risk of loss due to cryptocurrency volatility relative to traditional asset classes. The user of the system 100 can transfer value between cryptocurrency and a virtual asset. The value of the virtual asset will likely be less volatile than the cryptocurrency relative to traditional asset classes. For example, transferring value from a cryptocurrency sub-account 113 to a virtual USD sub-account 113 insulates the user from fluctuations in the cryptocurrency's value relative to USD and other traditional asset classes. It is assumed that USD is less volatile in value than the cryptocurrency relative to other assets. However, it should be understood that embodiments are not limited to virtual assets that are less volatile than cryptocurrency.

It should be understood that the above description is one methodology for allowing a user to transfer value between cryptocurrency and a virtual asset to avoid loss of value due to fluctuations in the exchange rate between cryptocurrency and traditional asset classes (e.g. USD). The order in which actions are performed may be varied as compared to that which has been described.

In a preferred embodiment, a transaction request is first made by a user for transferring cryptocurrency to a sub-account 113 associated with an asset class using a networked device 101-105. The request is received by the transaction engine 120 through the network. The transaction engine 120 obtains or has stored in memory the prevailing exchange rate for conversion of the cryptocurrency to an asset. In some embodiments, the transaction engine 120 may obtain exchange rates from multiple exchanges 160, 170A, 170B . . . N. The transaction engine 120 uses the exchange rate and determines a conversion result that is sent by the transaction engine 120 to the networked device 101-105 of the user.

The user is then queried and can then accept or reject the transaction. If the transaction is accepted, the cryptocurrency sub-account 113 of the user is debited and the asset class sub-account 113 (e.g. USD) is credited at the prevailing exchange rate. This occurs in real-time.

The prevailing exchange rate may be based upon a current exchange rate for a currency exchange plus an additional amount that is system dependent. The additional amount may include a system commission. The additional amount may also include a fluctuation factor in order to account for the difference between the prevailing rate and the anticipated rate obtained when the actual asset is purchased on an external exchange 160, 170A, 170B . . . N. Given that a plurality of users will be using the present systems and many transactions will occur on a regular basis, there will be a number of transactions that will lead to favorable transaction conditions and therefore a net gain for the system 100 and others that will lead to unfavorable transaction conditions and a net loss for the system 100. Given a large enough number of transactions, the discrepancy between the rate presented to the user in real-time and the actual purchase and sale of assets/cryptocurrency by the reserve processor should substantially cancel out. By having a system 100 that has a high volume of transactions, accounting can occur in real-time and allow for real-time transfers of value between users of the system 100, while the reserve processor 140 of the system 100 conducts transactions with external exchanges 160, 170A, 170B . . . Nin non-real-time.

The transaction engine 120 accounts for the transaction in the user account database 130 and registers the transfer of the asset and the change in obligation. A signal is sent that informs the reserve processing server 140 about the transaction, including information such as the net transfer of assets. At some future time, a reallocation of assets occurs in the reserve based on aggregate changes in obligations for multiple transactions of which the described transaction is only one of many. The transaction engine 120 ensures that the assets in the reserve 150 correspond to the aggregate virtual assets in the system's users' sub-accounts 113 by buying and selling assets on external exchanges 160, 170A, 170B . . . N and sending the proceeds of such asset purchase and sales to the reserve 150.

The user may move value between virtual assets in substantially the same way; a user can move value between virtual USD and another virtual currency or a virtual commodity or a virtual stock, and the user's account is updated at the account database server 130 in the account database 135 that holds the user's account. The transfer request will be processed by the transaction engine 120 and will cause instruction to be sent to the account database server 130 and the reserve-processing server 140. The reserve-processing server 140 communicates with the reserve 150 and this causes instructions to be sent to the appropriate exchange or exchanges 160, 170A, 170B . . . N until the desired asset is obtained and deposited in the reserve 150. In this system, assets of equivalent value to the virtual assets and cryptocurrency in user accounts are maintained by the reserve 150 in either physical or electronic form.

When cryptocurrency is bought or sold on an exchange 160, 170A, 170B . . . N the transaction is updated in accordance with the cryptocurrency protocol and is indicated on the cryptocurrency public ledger 190.

It should be evident that transactions can take place within the system 100 between users of the system 100 that have accounts. For example, a Japanese computer company with an account in the system 100 may receive in a desired virtual asset (e.g. Yen) from another account holder (e.g. an American student) that is purchasing computer from the Japanese company. The American student may have an account that has value stored in virtual USD, but may send virtual Yen to the account associated with the Japanese company. The American student does not need to engage any exchanges 160, 170A, 170B . . . N and the accounting process and the rebalancing of assets in the reserve 150 is invisible to either the Japanese company or the American student.

In the preceding example, the Japanese computer company may take the received virtual Yen in their account and convert the virtual Yen into a cryptocurrency and have the cryptocurrency sent to the Japanese company's cryptocurrency address/wallet. This process is also handled by the system 100 including the transaction engine 120, the cryptocurrency wallet known by the system 121, the reserve processor 140, the reserve asset and exchange processor 155 and cryptocurrency to monetary exchange 160. Once cryptocurrency is received at the cryptocurrency wallet 121 of the Japanese company, further operations occur outside of the system 100.

In general, the transaction engine 120 accounts for cryptocurrency entering and leaving the system 100. Additionally, the transaction engine 120 accounts for the conversion of cryptocurrency into virtual assets, and transfers of cryptocurrency and virtual assets between accounts 112 and sub-accounts 113. Although sub-accounts 113 are shown within a single user account 112, it should be understood that transactions between sub-accounts 113 are not limited to sub-accounts 113 under a single user account 112. The contemplated transactions may be between sub-accounts 113 of multiple different user accounts 112. In a similar manner, transactions between user accounts 112 are not limited to a single user account. The transaction engine 120 executes conversions of cryptocurrency to assets and assets to cryptocurrency that are stored in the reserve 150 through one or more external exchanges 160, 170A, 170B . . . N. The transaction engine 120 also executes purchases and sales of non-cryptocurrency assets that are stored in the reserve 150 via one or more exchanges 160, 170A, 170B . . . N. The transaction engine 120 identifies any transaction both from outside of the system 100 and within the system 100, and identifies the one or more user-accounts 112 and the transaction type and the denomination of a transaction. For example, a user may have a sub-account 113 that stores value as virtual USD. The user can send value from this sub-account 113 in the form of USD to another user of the system or in the form of cryptocurrency to an external cryptocurrency address. The user of the system may tell the transaction engine 120 the denomination of the transfer. For example, a user may wish to transfer $500 to an external account or the user may wish to transfer one Bitcoin from a sub-account that is represented as virtual USD. The transaction engine will determine based upon the request what components of the system are necessary to execute the transaction. As stated, if a user wishes to transfer $500, the transaction engine 120 will provide the user with the current exchange rate and, upon acceptance, the transaction engine 120 will update the user's account 112 showing a debit of $500 in the USD sub-account 113 of the user. The transaction engine 120 will communicate with the reserve processor 140 and the reserve processor 140 will cause $500 worth of bitcoin to be sent to the external account. The reserve processor 140 may access the bitcoin from a reserve account or from a pooled cryptocurrency system account.

The reserve processor 140 at some future time will use the transaction information along with transaction information from other transactions to rebalance the reserve 150 so that the reserve 150 maintains assets that are equivalent to the assets held in the user accounts 112. To account for the present transaction by itself, the reserve processor 140 will communicate with the USD/cryptocurrency exchange 160 to cause $500 to be exchanged into cryptocurrency and will update the reserve database of assets. The transaction engine

120 and reserve processor 140 communicate with each other and determine if a rebalancing of assets in the reserve 150 is necessary based upon the transactions that have occurred since the last rebalancing.

For convenience, an example is presented in which cryptocurrency is converted to a virtual asset for a single user. The corresponding transactions that occur between the reserve processor 140 and the external asset exchanges 160, 170A, 170B . . . N are accounted for. It should be recognized that a plurality of transactions can occur for various user's accounts 112 and that the transactions with the exchanges 160, 170A, 170B . . . N may be pooled together. When the transactions are pooled together, there is not a direct correspondence between each user transfer within a user's account 112 or between users of the system and a transfer of value between the reserve processor 140 and the asset exchanges 160, 170A, 170B . . . N. However, the pooled transactions, will reflect the overall transfer of assets such that there will be an equivalent amount of value within the reserve 150 as compared to the value of all of the user accounts 112 within the system 100.

If the user wishes to convert 10 units of cryptocurrency into virtual USD, the account database server 130 notes the request and a reserve processing server 140 communicates with an exchange 160, 170A, 170B . . . N. In some embodiments, the reserve processing server 140 may communicate with multiple exchanges 160, 170A, 170B . . . N and display the most favorable exchange rate. The conversion result is presented and the user may accept the conversion. In some embodiments, the results shown may include the system 100 commission. The user's account 112 is updated at the prevailing exchange rate and the user account database server 130 is updated. If the exchange rate were 400:1, the user's account 112 would be decremented by 10 units of cryptocurrency and 4000 virtual USD would be added to the virtual USD sub-account 113. The account database server 130 would communicate this transaction to the reserve processor 140. In some embodiments, the reserve processor 140 would update the account database including account records 135 and would sell 10 units of cryptocurrency that are held within the reserve 150 at the cryptocurrency exchange 160 for USD at the prevailing exchange rate. If the exchange rate were 400:1, the reserve 150 would receive in the equivalent of USD4000.

Figure 2:
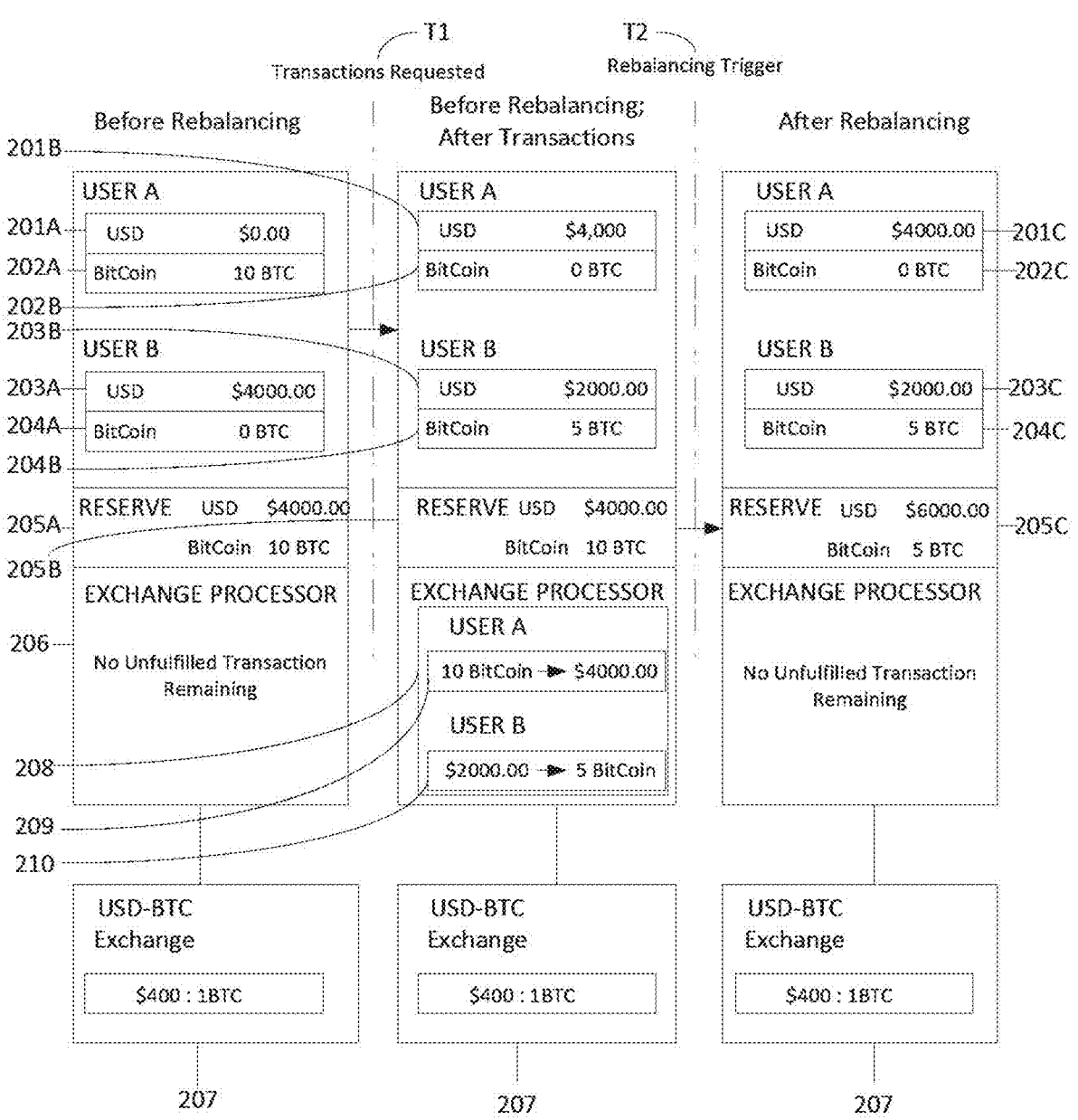
FIG. 2 shows a universal rebalancing in accordance with illustrative embodiments of the system.

FIG. 2 shows a universal rebalancing in accordance with illustrative embodiments of the system. In some preferred embodiments, the reserve processing server does not rebalance the assets in the reserve 205A when a transaction request occurs at T1. Instead, the reserve processor performs a universal system rebalancing of a pool of transactions of which the transaction is just one input. For example, assume for simplicity that the system has only 2 users: User A with no virtual assets in his USD sub-account 201A and 10 virtual bitcoins in his bitcoin sub-account 202A, and User B with virtual $4,000 dollars in his USD sub-account 203A and no virtual assets in his bitcoin sub-account 204A. The reserve 205A holds the assets represented by user's virtual assets 201A, 202A, 203A and 204A. In this case, the reserve 205A holds $4,000 and 10 Bitcoin. The reserve 205A communicates with an exchange processor 206. The exchange processor 206 communicates with the various exchanges and processes user transactions. In this example, the exchange processor 206 communicates with the USD-BTC Exchange 207. If User A converts his 10 virtual bitcoins for virtual dollars (at a conversion rate of $400:1 bitcoin obtained from the external exchange 207) and User B exchanges his virtual $4,000 dollars for 10 virtual bitcoins (at the same exchange rate), the net change on the assets within the reserve 205A is zero (this particular example is not shown in FIG. 2). When a global rebalancing trigger T2 occurs, there is no asset reallocation necessary because the reserve processing server knows there was no change in the net virtual assets held by users of the system. As a result, there is no change in the net assets held in the reserve 205A. Because the system is performing a universal rebalancing, the reserve does not send User A's request to the exchange 207, nor did it send User B's request to the exchange 207. Instead, the system sends a single pooled transaction request to the exchange 207 at time T2.

However, if User A requests a first transaction 209 for the sale of 10 Bitcoin for $4,000 and User B requests a second transaction 210 for the sale of $2,000 USD for SBTC at T1, the system now has a net mismatch. The net mismatch is between the total virtual assets ($6,000 USD and 5 BTC) held in all of the accounts 201B, 202B, 203B and 204B and the total assets held in the reserve 205B ($4,000 and 10 BTC). As can be seen, the reserve 205B did not rebalance after the transactions were requested at T1. Prior to the first transaction 209 and the second transaction 210 at T1, the total of virtual assets in the system was $4,000 and 10 Bitcoin. The reserve 205 also held $4,000 and 10 Bitcoin. After transaction 209, User A has virtual $4,000 in his virtual USD sub-account 201B and nothing in his Bitcoin sub-account 202B. After transaction 210 User B has 5 virtual Bitcoin in his Bitcoin sub-account 204B and the virtual $2,000 remaining in his virtual USD sub-account 203B. The reserve 205B, at this time, still holds $4,000 and 10 Bitcoin. If the system were to perform a rebalancing at T2, it would need to exchange 5 Bitcoin for $2,000 so that the reserve 205B assets would reflect the virtual assets.

When a rebalancing trigger occurs at T2, the exchange processor pools together all of the transactions 209, 210 that have been requested, prior to the trigger, into a pooled transaction 208. That pooled transaction 208 is communicated with the exchange 207 at T2. The reserve 205C assets are updated. As shown, the reserve after rebalancing 205C holds $6,000 USD and 5 Bitcoin. The reserve assets after rebalancing 205C now match the value of the virtual assets represented in all of sub-accounts 201C-204C. In practice, the reserve assets after rebalancing 205C may differ from the value of the virtual assets in all sub-accounts 201C-204C. In some embodiments, the difference may be accounted for because the system may take a commission. Additionally, in some instances, the exchange rate may change from time T1 to time T2.

The transaction engine communicates with an intermediary pool of cryptocurrency. The intermediary pool of cryptocurrency serves as a source of cryptocurrency that may be available to output transactions from the system. Because the system has cryptocurrency in the intermediary pool, users can send cryptocurrency instantly from non-cryptocurrency-denominated sub-accounts without waiting for assets in the reserve to be sent to a cryptocurrency exchange and converted to cryptocurrency. In some embodiments, the recipient may not receive the cryptocurrency instantaneously because of the delay involved when updating the cryptocurrency ledger. The system may exchange assets at an external exchange in order to obtain cryptocurrency to replenish the intermediary pool. Thus, the transaction engine may cause cryptocurrency to be sent from the intermediary pool without waiting for completion of an exchange transaction with the external exchange.

Figure 3:
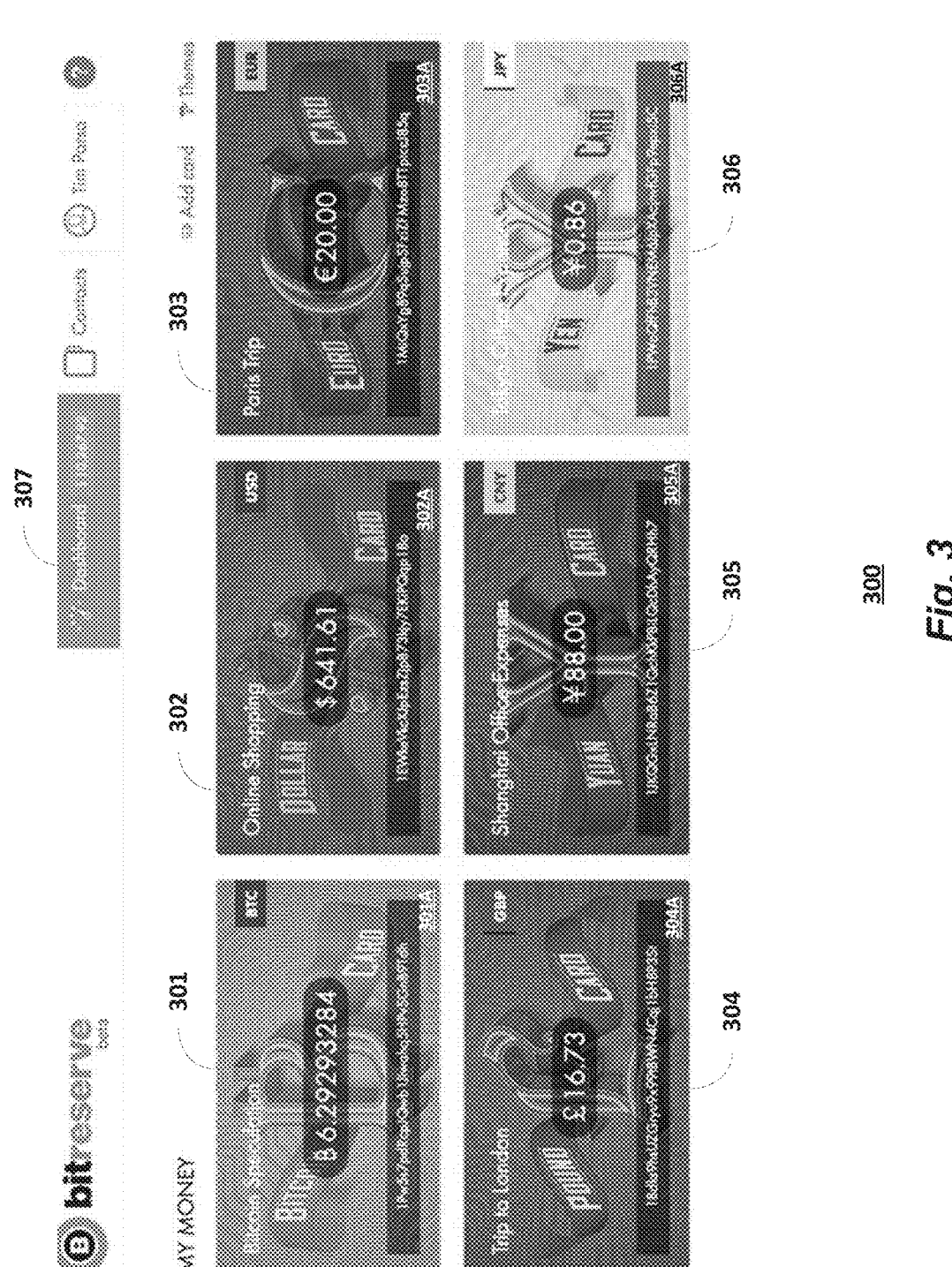
FIG. 3 is a screen shot of a web page provided by a server of the system that shows a plurality of sub-accounts for holding cryptocurrency as a virtual asset in accordance with illustrative embodiments of the present invention.

FIG. 3 is a screen shot of a web page 300 provided by a server of the system that shows a plurality of sub-accounts for holding cryptocurrency as a virtual asset. As shown, a webpage is served from the system to a user that has logged into the user's account is presented.

As shown, the total amount stored in the account in terms of virtual USD is $10,267.92 as indicated in the Dashboard bar 307. It should be noted that the presented total for the account is based on an aggregation of all of the sub-accounts converted to USD based on the prevailing exchange rate. Upon creation of a user account, the user can add cryptocurrency from the user's cryptocurrency address that is associated with an account that is external to the system. The cryptocurrency is transferred from the user's external cryptocurrency address to a cryptocurrency address associated with the system, and the system updates the user's account with the amount of cryptocurrency. The user may then distribute the cryptocurrency to different sub-accounts that are associated with a virtual asset type. Examples of virtual asset types as shown include: Bitcoin 301, USD 302, Euros 303, British Pounds 304, Chinese Yuan 305 and Japanese Yen 306. Other types of virtual assets may also be represented including securities (e.g. stocks and bonds) and commodities (e.g. gold, silver, platinum etc.). The user's account as shown in FIG. 3 includes six subaccounts, each of which have a different user-created account heading and also a specified denomination. In some embodiments, the user may have more than one sub-account for a single denomination. For example, in addition to the "Online Shopping" sub-account 302 that is in US dollars, a user may also have another sub-account in US dollars with a different heading.

Each of the sub-accounts is associated with a separate cryptocurrency address 301A, 302A, 303A, 304A, 305A and 306A that is under the control of the system. Thus, there are cryptocurrency addresses (public keys) associated with the user's sub-accounts whose private keys are under the control of the system. In the sub-account entitled Bitcoin Speculation 301, the user has 6.2929 Bitcoins (crypto currency). Additionally, the user has $641.61 in virtual USD that are stored in the Online Shopping sub account 302. Thus, virtual assets can be transferred between a user's subaccounts and can also be transferred to another user's account within the system. These transactions within the system can occur in real-time and do not require waiting for confirmation by the Bitcoin Network, which can take several hours. The virtual assets may also be transferred to accounts outside of the system. When virtual assets are transferred external to the system, the virtual assets are first converted to a cryptocurrency using a crypto-currency address associated with the system, which can also be associated with a user, and then the cryptocurrency is sent to the desired external cryptocurrency address. These external transactions need to wait for confirmation by the Bitcoin Network on the public ledger and blockchain before any further transfer may occur.

Figures 4A, 4B:
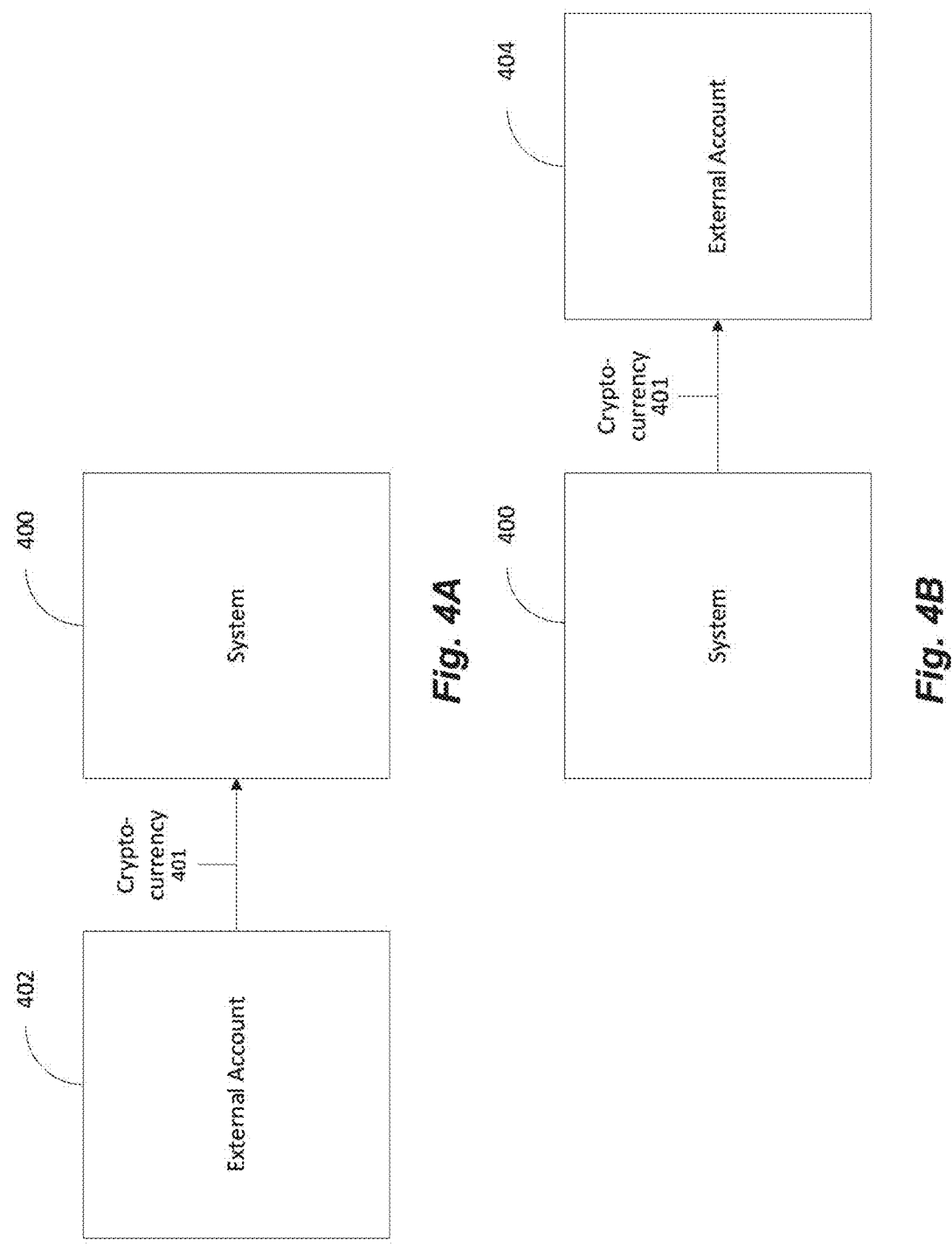
FIG. 4A shows the transfer of cryptocurrency from an external account into the system in accordance with illustrative embodiments of the present invention.
FIG. 4B shows the transfer of cryptocurrency from the system to an external account in accordance with illustrative embodiments of the present invention.

FIG. 4A shows the transfer of cryptocurrency 401 from an external account 402 into the system 400. As shown, in some embodiments, the system 400 only imports cryptocurrency 401. Although various embodiments discuss exchanges and sub-accounts in various denominations, some embodiments of the system 400 only accept inputs of cryptocurrency 401 from an external account 402 address. Internally to the system 400, cryptocurrency can be converted into different assets, moved around and associated with different virtual assets. The reserve in the system 400 may hold actual assets in denominations other than cryptocurrency, but those assets are converted back into cryptocurrency 401 when sent external to the system 400. Thus, a user can input cryptocurrency into the system and cryptocurrency can be output from the system by the user. FIG. 4B shows the transfer of cryptocurrency from the system 400 to an external account 404. Although internally the system 400 may hold assets in various denominations, in some embodiments of the system, only cryptocurrency 401 may be sent out of the system to an external account 404 address. Although the figure shows external account 402 as a single block, illustrative embodiments of the invention may receive cryptocurrency 401 inputs from a plurality of external accounts 402. In a similar manner, external account 404 is not intended to limit embodiments of the invention to a single external account 404 address. The system 400 may output cryptocurrency 401 to a plurality of external accounts 404. However, not all embodiments are limited to the input or the output of cryptocurrency. In some embodiments, for example, fiat currencies may be input and output from the system.

Figure 5:
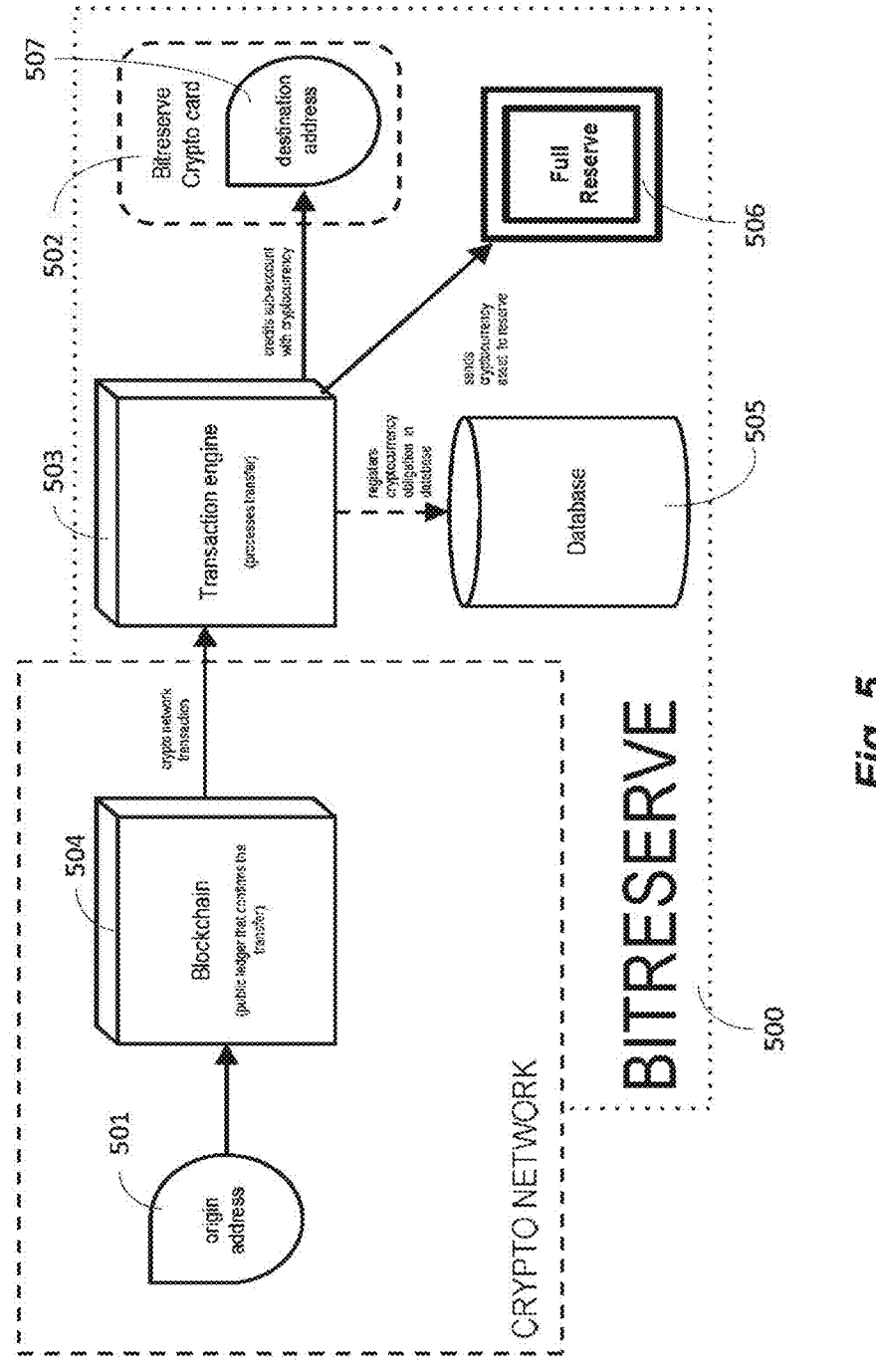
FIG. 5 shows the communications that occur internal to the system when a transfer of cryptocurrency from an external cryptocurrency address is sent to a sub-account of a user of the system, wherein the sub-account stores cryptocurrency in accordance with illustrative embodiments of the present invention.

FIG. 5 shows the communications that occur internal to the system 500 when a transfer of cryptocurrency from an external cryptocurrency address 501 is sent to a sub-account 502 of a user of the system 500, wherein the sub-account 502 stores cryptocurrency. In this example, the virtual asset is virtual cryptocurrency. As expressed before, a sub-account 502 can be associated with any virtual asset including cryptocurrency, virtual fiat currency, virtual commodities and virtual securities. However, in some embodiments, for example where fiat currency may be input or output, a sub-account may be associated with an asset.

A transferor external to the system associated with the original address 501 of the cryptocurrency transfers the cryptocurrency to a user account within the system. Preferably, the external transferor transfers the cryptocurrency into the system 500 by sending the cryptocurrency to the destination address 507 associated with the sub-account 502. The system 500 includes a database 505 that provides external parties with a public key for the system and the database also associates the user account with the transfer. The database may be included in the account database server. The external blockchain 504 is updated based upon the transfer of the cryptocurrency into the system 500. The transaction engine 503 receives the cryptocurrency transfer request. The transaction engine 503 recognizes that the cryptocurrency is being transferred to a particular user through a user identifier, such as an account number, a user name, or a cryptocurrency address 507 of the user's sub-account 502 under the control of the system. The cryptocurrency address 507 associated with a user internal to the system may be on the face of every card or user sub-account. A user may copy and send their account address 507 to a person the user wishes to receive payment from.

The transaction engine 503 registers a cryptocurrency obligation for the transferred cryptocurrency in the database 505 associated with the user's account. The transaction engine credits the sub-account 502, so that the user will see the cryptocurrency obligation on the user's crypto currency card that represents the user's sub-account 502. Specifically, the transaction engine 503 includes a cryptocurrency account server that receives the transfer of cryptocurrency. The cryptocurrency account server, in response to receipt of the transfer of cryptocurrency, updates the data pertaining to obligations of the system to the user in the user account database 505. The transaction engine 503 also sends a message to the reserve processing server associated with the reserve 506 and the reserve processing server is updated to show the addition of the cryptocurrency to the system 500. The reserve processing server awaits a global rebalancing trigger to update the assets held in the reserve 506. It should be understood by one of ordinary skill in the art that the term card may refer to both a virtual card as represented on the display of a user device or the card may be a physical card that can be electronically updated.

Figure 6:
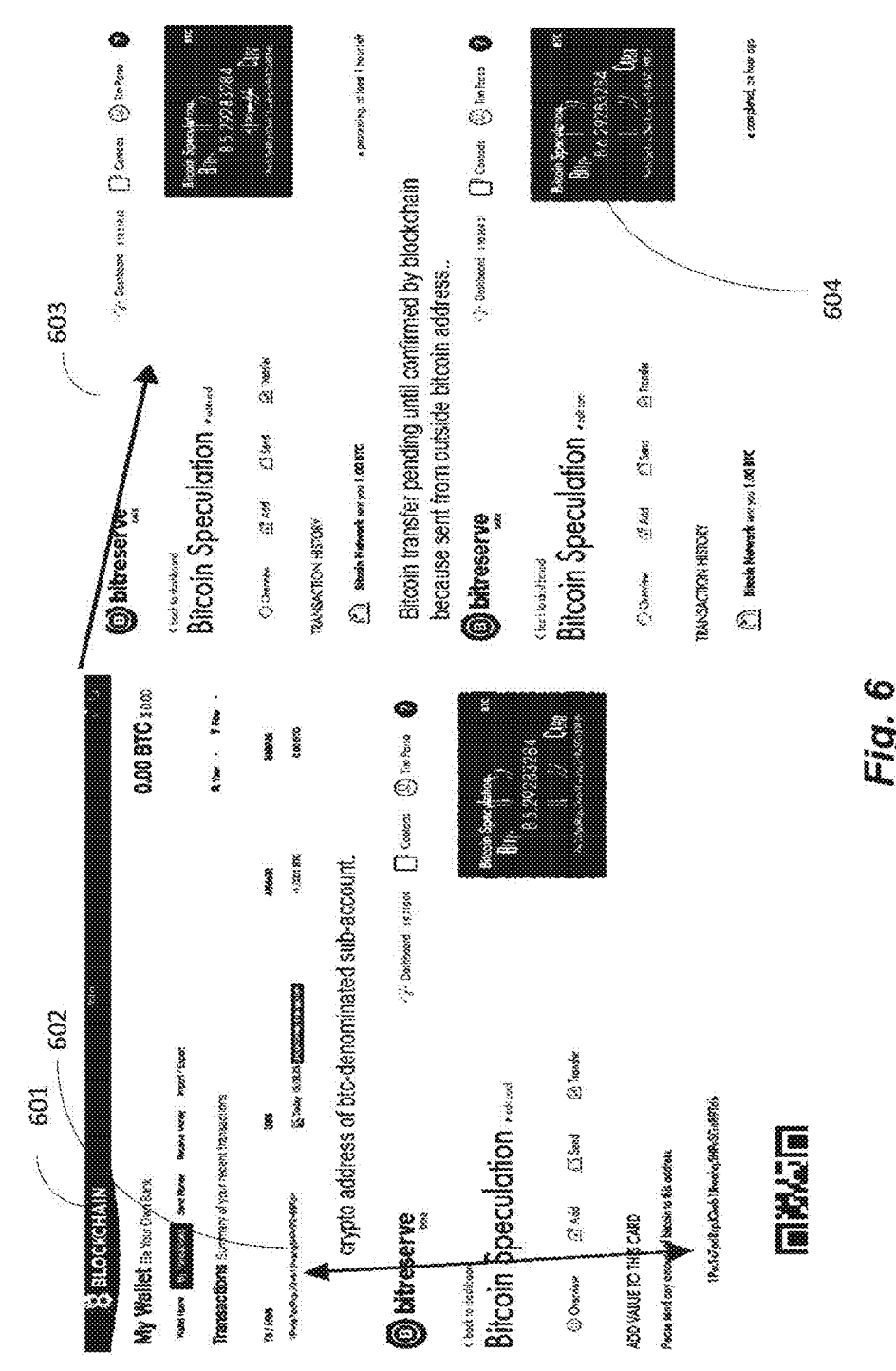
FIG. 6 shows the graphical user interfaces for the transaction with the system of FIG. 5 in accordance with illustrative embodiments of the present invention.

FIG. 6 shows the graphical user interfaces for the transaction with the system of FIG. 5. In this example, one Bitcoin is sent from an external Bitcoin address as represented by the graphical user interface 601 at the upper left of FIG. 6. The webpage associated with external Bitcoin address is labeled My Wallet and is part of the Blockchain. The user interacts with this webpage and executes a transaction sending one Bitcoin to a sub-account of a user within the system. The user enters the cryptocurrency address associated with the sub-account 602 to transfer the Bitcoin into the system and the transaction engine receives the message and associates the cryptocurrency with the sub-account of the receiving user 603. The transaction engine holds the transfer as pending while the cryptocurrency network confirms the transaction. Once the transaction is complete, the transaction engine updates the webpage showing the user's account to indicate that the transaction is complete and that the sub-account has an additional Bitcoin (changing from 5.292 to 6.292 Bitcoins) 604. The Bitcoins in the user's sub-account represent the obligation of the system to the user.

Figure 7:
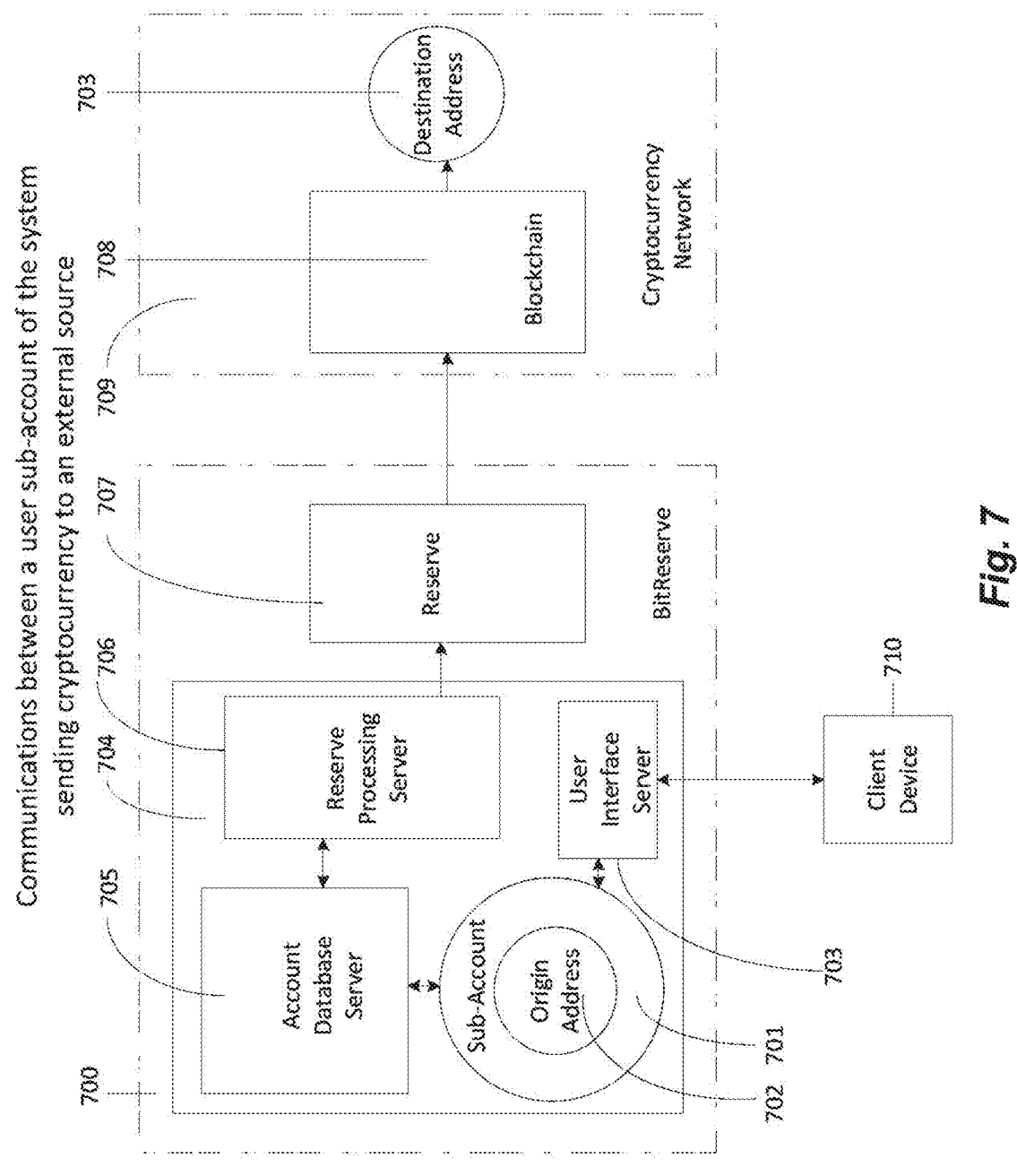
FIG. 7 shows the communications that occur internal to the system when cryptocurrency associated with a user's cryptocurrency sub-account of the system is sent to an external cryptocurrency network in accordance with illustrative embodiments of the present invention.
Figure 8:
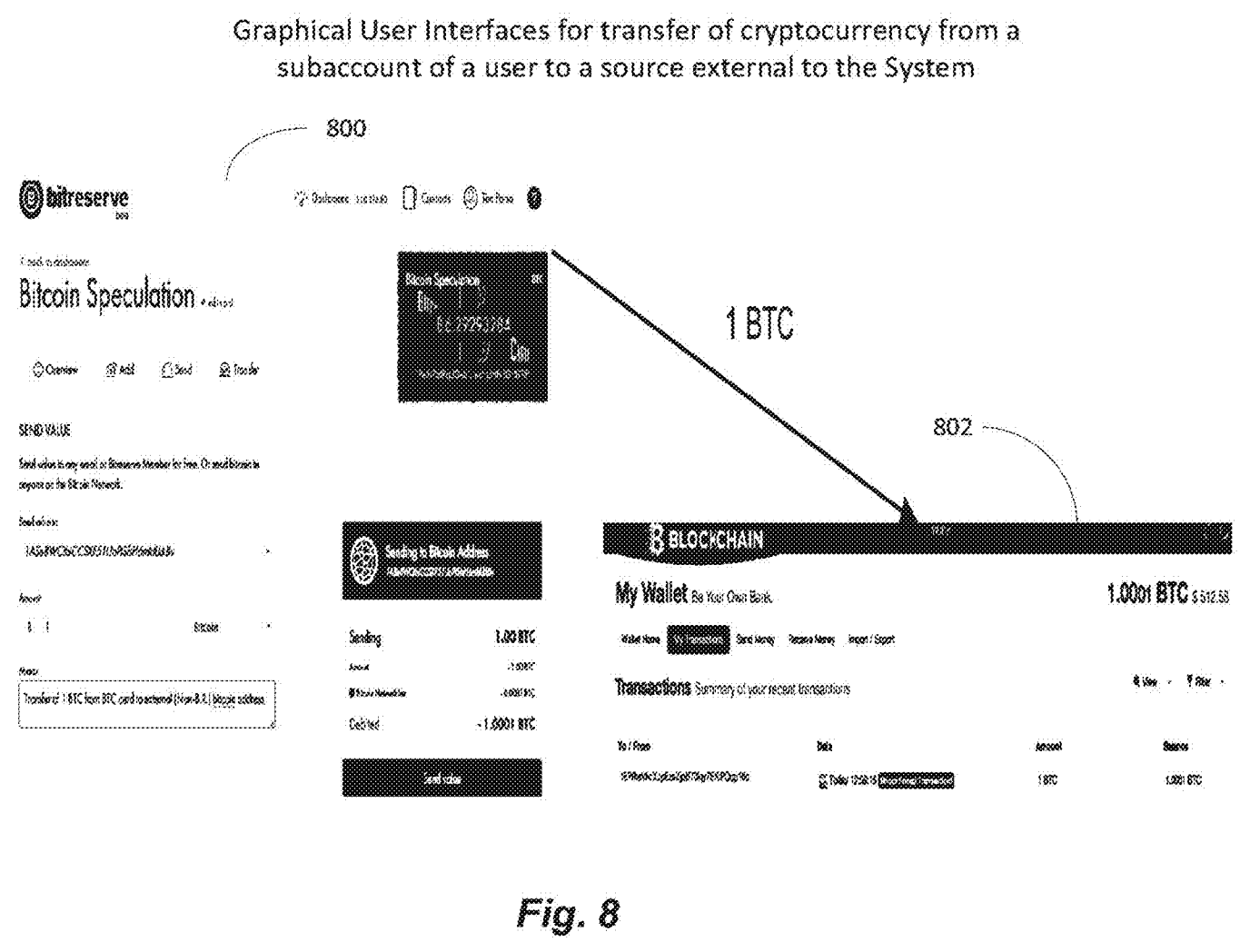

FIG. 7 shows the communications that occur internal to the system 700 when cryptocurrency associated with a user's cryptocurrency sub-account 701 of the system 700 is sent to an external cryptocurrency network 709. Specifically, the cryptocurrency is sent from the user sub-account 701 having origin address 702 to the destination address 703. The transaction engine 704 receives a request from a client device 710 that is associated with a verified user having a user account 701. The user communicates with the interface server 703 using the client device 710. The request causes cryptocurrency to be debited from the user's sub-account 701 in the user account database server 705 and the graphical user interface server 703 is also updated. The cryptocurrency is then sent to the external cryptocurrency address 703. In some embodiments, the account database server 705 updates the reserve processing server 706 which instructs the reserve 707 to send out the cryptocurrency. In some other embodiments, the cryptocurrency may come from an intermediary pool of Bitcoin that is associated with the system 700. After the intermediary pool is depleted or reaches a predefined threshold level, the reserve 707 may then transfer an amount of Bitcoin from the full reserve 707 to the intermediary pool of Bitcoin to replenish the intermediary pool. It should be recognized that transmission need not always go through an intermediary pool and that in other embodiments the Bitcoin or other cryptocurrency is transferred directly from the reserve 707. The transaction is then registered on the public blockchain 708 for the cryptocurrency, which will show the cryptocurrency coming from the system 700 and being sent to the destination address 703. FIG. 8 shows the graphical user interface presented to the user during the transaction of FIG. 7. The transaction server is contacted by a user with an account within the system. The user enters information into the web page 800 and transmits the information to the transaction engine indicating that the user wishes to transfer one Bitcoin to a cryptocurrency account external to the system. On the right hand side of FIG. 8, we see a screen that shows a web page 802 from an external cryptocurrency account that indicates that one Bitcoin has been transferred, but that the cryptocurrency network has not confirmed the transaction.

It should be recognized that transactions that occur within the system can occur in real-time because these transactions do not require confirmation by the cryptocurrency network to be completed. The transactions engine causes the reserve processor to update the user account database for the transaction in real-time and the transaction engine causes the reserve processor to update the reserve database to reflect changes to the assets. The system reduces the risk of fraudulent transfers when all transactions occur within the system and does not require any independent verification. Given that only cryptocurrency enters and exits the system in some embodiments, and these transfers are externally verified, the transactions within the system should always be valid and confirmed.

Figure 9:
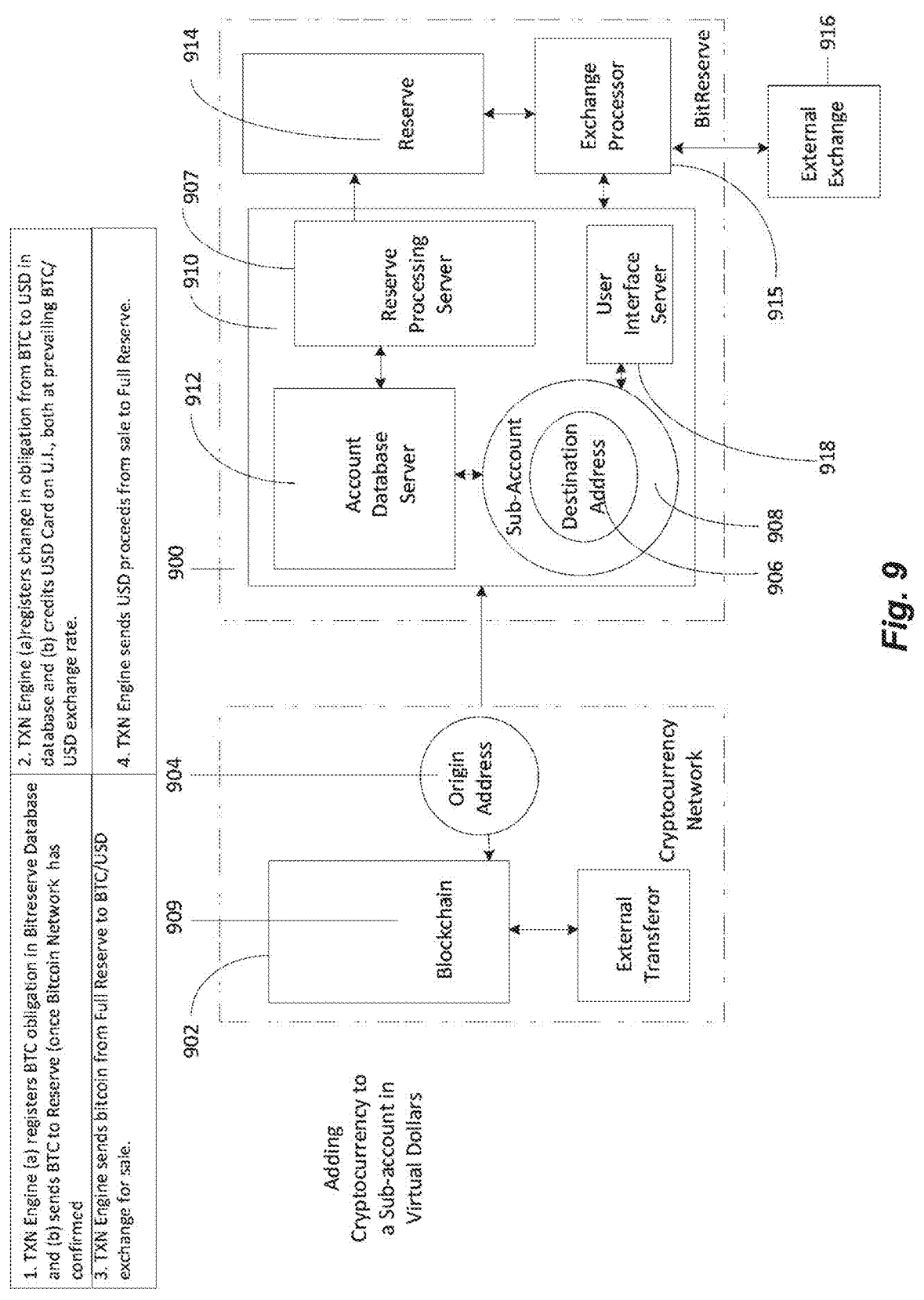
FIG. 9 shows the communications between components of the system when a user having a system account wishes to add cryptocurrency to the account and have the cryptocurrency represented as virtual USD in the user's subaccount in accordance with illustrative embodiments of the present invention.

FIG. 9 shows the communications between components of the system 900 when a user having a system account wishes to add cryptocurrency to the account and have the cryptocurrency represented as virtual USD in the user's subaccount. This may be accomplished through a transfer from an external Bitcoin address 904 on a crypto network 902 to an internal Bitcoin address 906 associated with the system 900 (the internal Bitcoin address is also associated with the user's sub-account). Specifically, the address 906 is of the user's USD sub-account 908. The transaction engine 910 registers the Bitcoin obligation to the user by updating data associated with the user's account on the account database server 912. The transaction engine 910 then sends the Bitcoins to the reserve 914 once the system 900 has confirmed the transaction.

The transaction engine 910 may detect that the transfer of cryptocurrency is going into the user's USD sub-account 908 and registers the change in obligation from virtual Bitcoins to virtual USD within the Bitreserve account database server 912. The updated account value in virtual USD is calculated based on the prevailing exchange rate obtained by the exchange processor 915 from an external exchange 916. The transaction engine 910 credits the user's account with virtual USD at the prevailing exchange rate (this is reflected on the user interface server 918). The transaction engine 910 sends an equivalent amount of Bitcoin from the full reserve 914 to the Bitcoin exchange 916 for exchanging the Bitcoins to USD, if necessary, when the system 900 performs a global rebalancing. The transaction engine 910 then causes the proceeds in USD to be sent and stored within the full reserve 914. Thus, there is an equivalent number of USD within the reserve to represent the virtual USD held in the account of the user. In some embodiments, a system commission may be included in a conversion rate for a user transaction. The commission may become an asset in the reserve 914, such that the system is "over-reserved." In some other embodiments, there may be an inequality between the assets in the reserve 914 and the aggregate virtual assets in users' accounts whose value is substantiated by the assets. For example, the fluctuations in exchange rates from the time of an exchange transaction to the time of global rebalancing may cause inequality between the reserve assets and the aggregate virtual assets. However, it is expected that the net change caused by these inequalities on the system should be minimal.

Figure 10:
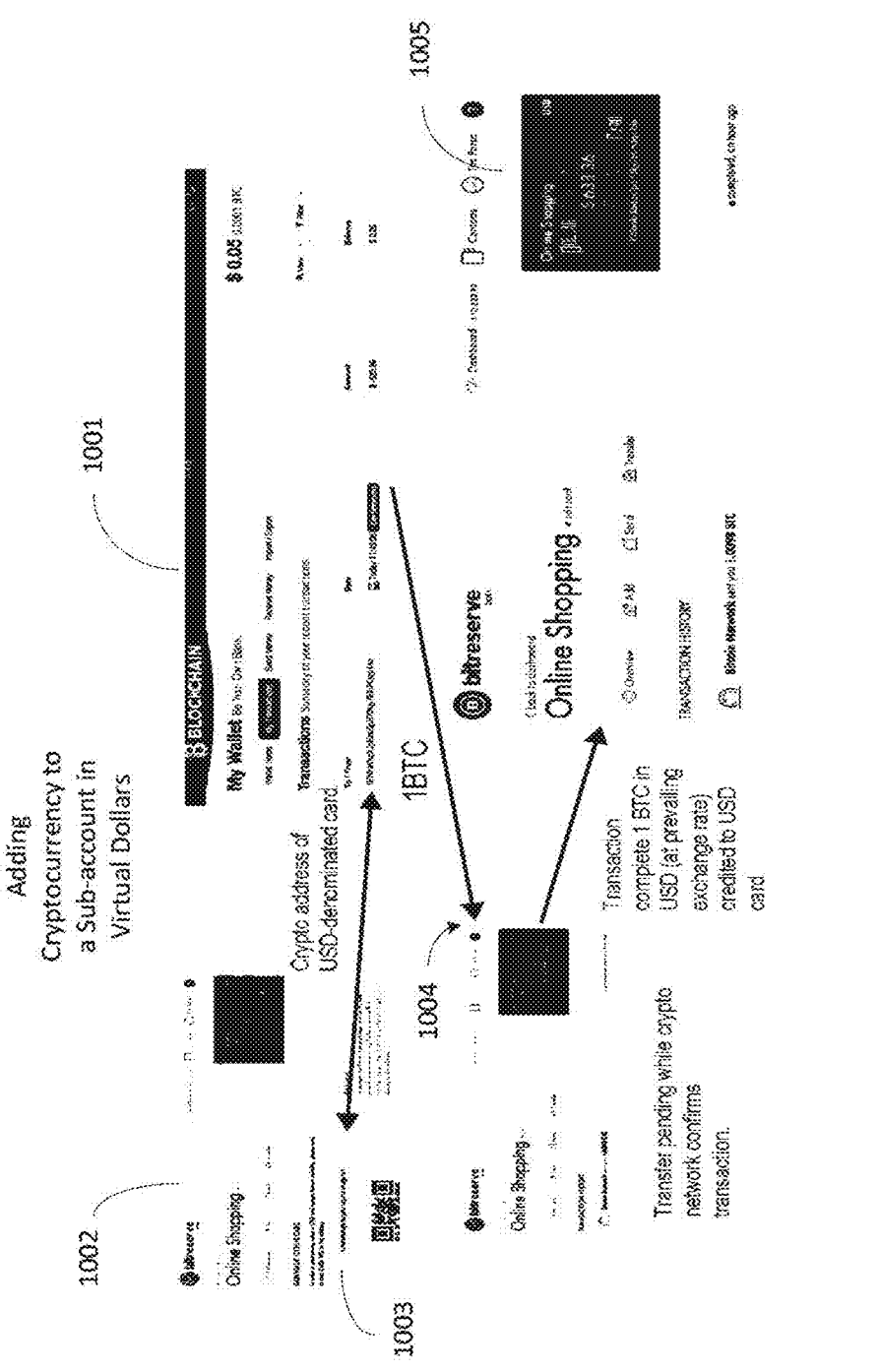
FIG. 10 provides the graphical user interface from the viewpoint of the user during the transaction of FIG. 9 in accordance with illustrative embodiments of the present invention.

FIG. 10 provides the graphical user interface from the viewpoint of the user during the transaction of FIG. 9. In FIG. 10, the user has two windows open. A first window 1001 that shows a webpage that is associated with an external Bitcoin address (BLOCKCHAIN.info wallet). Bitcoin may be transferred from the external Bitcoin address to the user subaccount as represented by the webpage (Online Shopping) 1002 by transferring the cryptocurrency to the address associated with sub-account 1003. The transfer is indicated as pending 1004 while the cryptocurrency network confirms the transaction. When the transaction is complete, one Bitcoin is represented in USD and credited to the sub-account as represented by the graphical card "Online Shopping" 1005. Transactions that occur between the system and an external address require additional processing time to account for external verification of the transaction and the updating of the blockchain.

Figure 11:
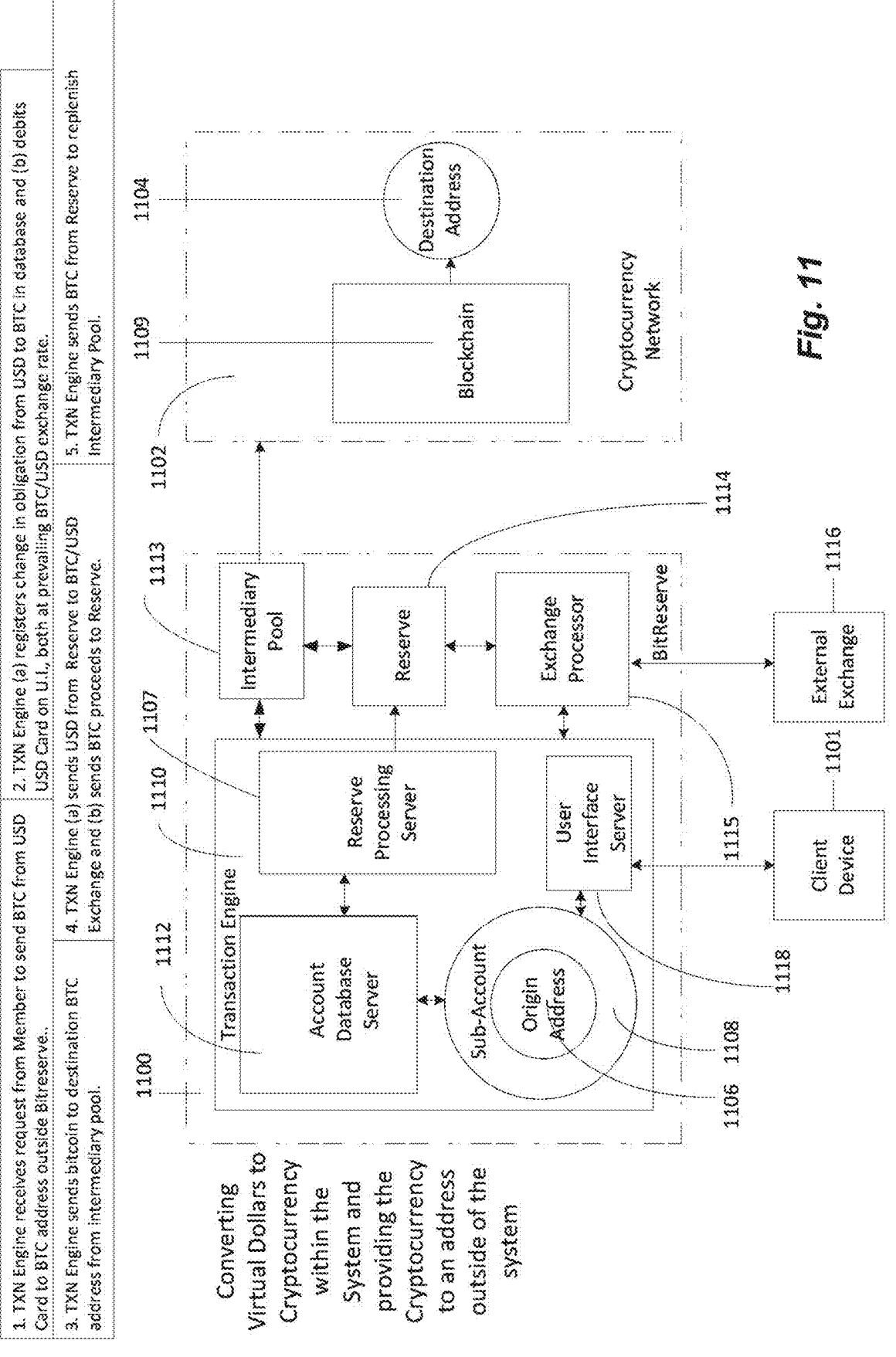
FIG. 11 shows the communications between the system and an external address when a user wishes to convert virtual USD associated with a user sub-account to cryptocurrency and provide the cryptocurrency to the external address in accordance with illustrative embodiments of the present invention.

FIG. 11 shows the communications between the system 1100 and an external address 1104 when a user wishes to convert virtual USD associated with a user sub-account 1108 to cryptocurrency and provide the cryptocurrency to the external address 1104. First, the transaction engine 1110 receives a request from a user that is logged in and identified as a user having an account within the system 1100. The user makes the request, from the client device 1101, to send Bitcoin (i.e. cryptocurrency) from a sub-account 1108 that is represented as virtual USD to an external cryptocurrency address 1104. For example, the user may wish to transfer one Bitcoin from the user sub-account 1108 that holds virtual USD. The transaction engine debits the user's sub-account 1108 at the prevailing USD/Bitcoin exchange rate obtained from the external exchange 1116. In some embodiments, the system 1100 may have the exchange rate in memory. The transaction engine 1110 updates the user interface server 1118 at the client device 1101 so that the debit is reflected. At the same time, the cryptocurrency obligation reduction is registered in the account database server 1112. The user account may have, for example, $1000 virtual USD in the sub-account 1108 and the exchange rate may be $525/Bitcoin. Therefore, the record in the database 1112 associated with user account will be updated to indicate that the sub-account 1108 now has $475 virtual USD remaining. The graphical interface that is presented to the user in the form of a web page with a virtual USD card will likewise be updated to indicate that the account now has $475 and indicate that one Bitcoin is being transferred to an external address 1104.

The transaction engine 1110 sends an equivalent amount of Bitcoin from the intermediary pool 1113 of Bitcoin to the destination address 1104. The intermediary pool 1113 provides a source of Bitcoin for transactions that send Bitcoin to a destination outside of the system 1100. In some embodiments, the intermediary pool 1113 may be held in the reserve 1114. In some other embodiments, the intermediary pool 1113 may be external to reserve 1114. If the system 1100 did not provide the intermediary pool 1113, there would be an additional temporal delay caused by waiting for the exchange of $525 for Bitcoin at the external exchange 1116, and then sending that Bitcoin to the external address 1104. Bitcoin may be sent directly from the intermediary pool 1113 without the need to wait for the exchange of dollars held in the reserve 1114. Although a user may not have a cryptocurrency sub-account 1108 (or a null cryptocurrency sub-account), the user may still send cryptocurrency out of the intermediary pool 1113 by sending value from a virtual asset sub-account 1108 to a destination address 1104. It should be understood that although the intermediary pool 1113 may allow for real-time sending of Bitcoin without having to update the blockchain for the exchange transaction, it may not necessarily allow for real-time receipt of Bitcoin. With some cryptocurrencies, the cryptocurrency ledger may still need to be updated to reflect the transfer of cryptocurrency from origin address 1106 to destination address 1104.

However, the transaction may still require the exchange of dollars to cryptocurrency so that the intermediary pool 1113 may be replenished. To replenish the value of cryptocurrency sent by the intermediary pool 1113, the transaction engine 1112 may send USD from the reserve 1114 to an exchange 1116 that exchanges the USD for Bitcoins, and the proceeds of this transaction may be sent and logged at the reserve 1114. The transaction engine 1112 then sends Bitcoins from the reserve 1114 to the intermediary pool 1113 to replenish the intermediary pool 1113. In some embodiments, after Bitcoin is sent from the intermediary pool 1113, the reserve 1114 may replenish the intermediary pool 1113. In some embodiments, the reserve 1114 may replenish the intermediary pool 1113 as users input new Bitcoin into the system 1100. In some other embodiments, the reserve 1114 may automatically begin exchanging assets for Bitcoin when the amount of Bitcoin in the intermediary pool 1113 drops below a certain threshold. In some other embodiments, a system 1110 commission earned from user transactions may be used to replenish the intermediary pool 1113.

FIG. 12 shows the user interfaces from the viewpoint of the user during the transaction of FIG. 11. On the left side of FIG. 12 is the user interface 1201 for the user account of the system. The user account shows a sub-account titled Online Shopping with $641.61 in virtual USD. The user decides to send one Bitcoin to a Bitcoin address as provided for in the box labeled "Send value to" 1202. The transaction engine debits the user's account an equal amount of virtual USD at the prevailing Bitcoin/USD exchange rate 1203. The transaction engine sends the one Bitcoin to the appropriate address. On the right side of the figure is a representative screen shot of a web page that shows a Bitcoin Account 1204, which shows the transaction of one Bitcoin having an equivalent value of $520.95 is being transferred to the account, but the transfer has not yet been confirmed 1205. The party receiving the 1 Bitcoin may wait for confirmation of the transaction and the updating of the Blockchain before any further transfers may be accomplished for the received 1 Bitcoin. Because Bitcoin transfers are not instant, and the exchange rate of Bitcoin to fiat currency may fluctuate during the transfer period, the value received by the account external to the system may not be the same as the value sent from the user account.

Figure 14:
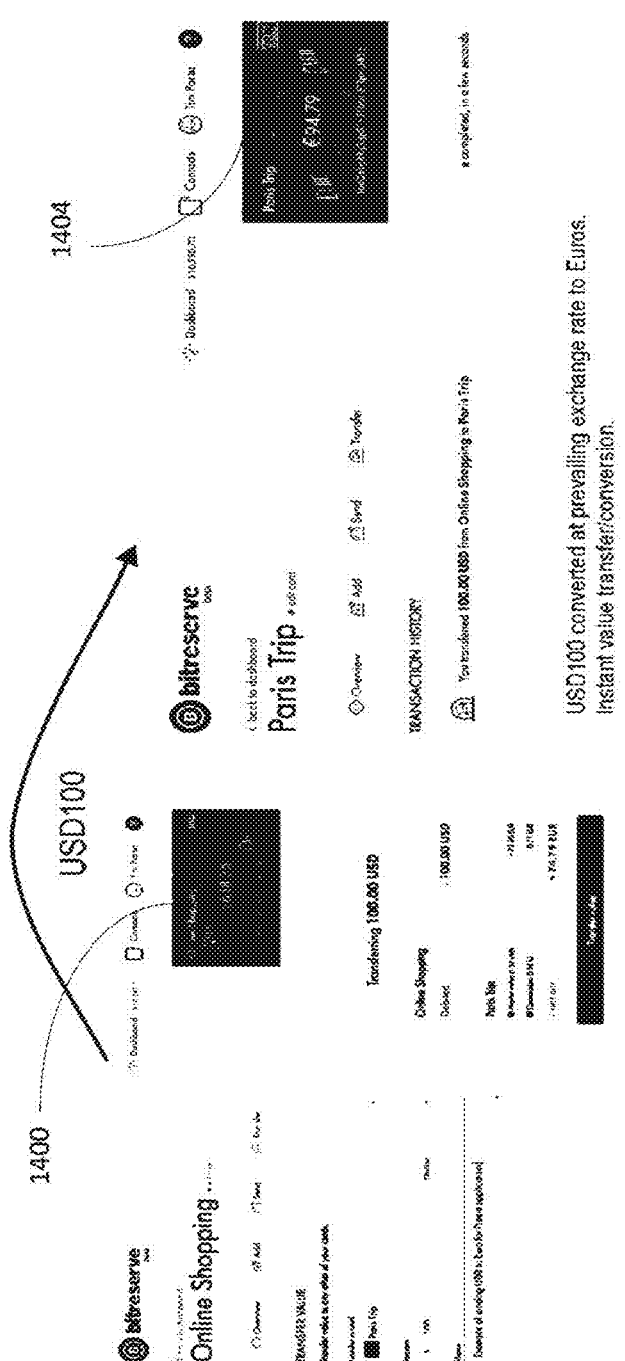
FIG. 14 shows the user interfaces from the viewpoint of the user during the transaction of FIG. 13 in accordance with illustrative embodiments of the present invention.

FIG. 13 shows the communications that occur within the system 1300 when virtual assets from a first sub-account 1312 are sent to a second sub-account 1314. The sub-accounts 1312, 1314 are associated with the same user account 1311 for two different virtual assets. FIG. 14 shows the user interfaces from the viewpoint of the user during the transaction of FIG. 13. The originating sub-account 1312 has value stored in the form of a virtual asset, shown in FIG. 14 as virtual USD 1400. In this example, $100 USD is being transferred from a user's Online Shopping sub-account 1400 storing virtual USD to a user's sub-account titled Paris Trip 1404, which represents value in virtual Euros. The user indicates through the graphical interface of FIG. 14 that the user wishes to move the virtual USD to the Paris Trip sub-account. (corresponding to 1214 in FIG. 13) This request is transmitted to the transaction engine 1304, and the transaction engine 1304 registers the reduction of the obligation in the account database server 1305. Once the transaction engine 1304 obtains the exchange rate from the external exchange 1316, the first sub-account 1312 is debited $100 virtual USD. The transaction engine 1304 communicates with the reserve processing server 1306 which updates the account database server 1306. The account database server 1306 registers the obligation for the sub-account 1314 having a destination address 1315. The transaction engine 1304 also causes the user's destination sub-account 1314 (i.e. virtual Euros sub-account) to be credited with Euros at the prevailing exchange rate. As shown in FIG. 14, the second sub-account is credited $100 USD at the prevailing exchange rate. Given that the virtual assets of the sub-accounts 1312, 1314 are of different asset classes, the transaction engine 1304 will have to incorporate these transactions in the pool of transactions when a global rebalancing is performed for the reserve 1307.

Additionally, the system 1300 may account for any transaction fees that occur as the result of using one or more of the available exchanges 1316. It should be understood that transaction fees can be included in any of the preceding examples and the transaction engine 1304 will account for those fees when performing an accounting of the user's transactions. In the present example, FIG. 14 shows that the market value is presently 1.32USD/Euro resulting in 75.50 Euros being transferred minus the commission fee of 0.71 Euros. Thus, the transaction engine transfers 74.79 Euros, to the Paris Trip sub-account 1404 from the Online Shopping sub-account 1400. The transaction engine accesses the reserve and will access actual assets in the form of USD and will convert $100 USD to Euros using an exchange that is external to the system. The proceeds are received by the exchange processor or other system processor and the processor stores the proceeds in the reserve. Additionally, the database associated with the reserve is updated to reflect the sale of the $100 USD and the addition of the 75.50 Euros. As such, the reserve's accounting should be equivalent to the accounting for the user's sub-account transfer.

FIG. 15 shows the communications that occur within the system 1500 when a virtual asset from a first sub-account 1512 is sent to a second sub-account 1514. The sub-accounts 1512, 1514 are associated with different user accounts 1518, 1520 within the system 1500 for the same virtual asset. A first user, having a first user account 1518, may transfer virtual USD from a virtual USD sub-account 1512 to a second user, having a second user account 1520.

The second user account 1520 may also have a sub-account 1514 denominated in virtual dollars. To request the transaction, the first user may access the Bitreserve network from the client device 1510 in communication with the user interface server 1503. On the user interface, the first user may send virtual dollars to a receiving sub-account 1514 by entering the destination address 1515 of the sub-account 1514 and the amount of transfer. Because the virtual assets are the same (i.e. USD to USD), the transaction engine 1504 does not need to obtain an exchange rate from the external exchange 1516. The user confirms the transaction, and the request is submitted.

Once the request is submitted through the user interface server 1503, the account database server 1505 is updated. Specifically, data is updated to indicate that the obligations of the system 1500 to the sending sub-account 1513 are reduced by the transferred amount. Additionally, data relating to the receiving sub-account 1515 is updated to indicate that the obligations of the system 1500 to the receiving sub-account 1515 are increased by the transferred amount. Because the dollar sub-account 1512 derived it's value from an initial verified cryptocurrency input (as every sub-account in the system does), the transaction between users is instantaneous. Additionally, because the transaction takes place completely within the system 1500, and the transfer of virtual assets is from dollars to dollars, the system 1500 does not need to send this transaction to the reserve processing server 1506 to be pooled with the other transactions. Alternatively, the system 1500 may send the transaction to the reserve processing server 1506 to be pooled with other transactions, this transaction having no net effect upon the global reserve rebalancing.

Figure 16:
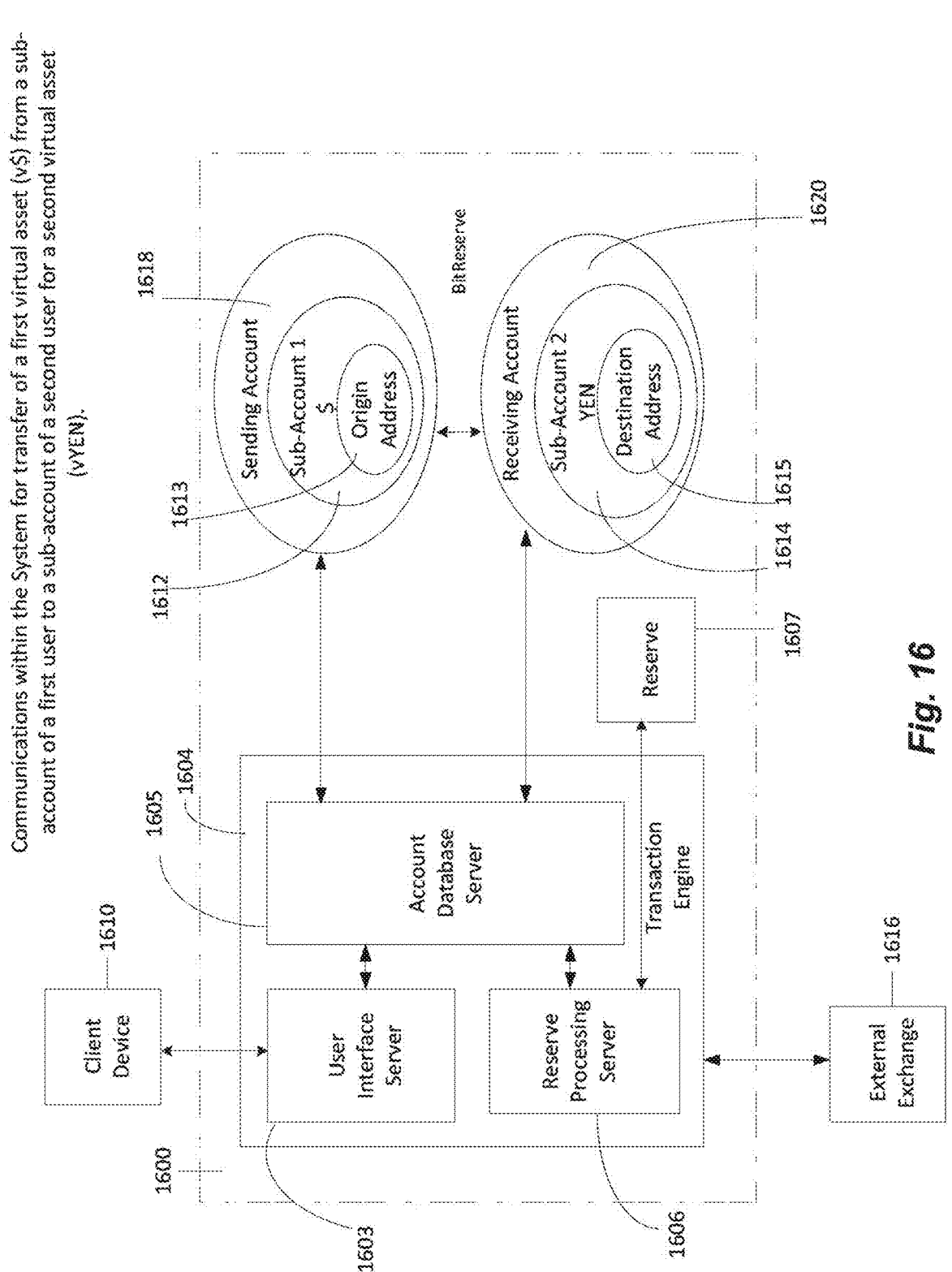
FIG. 16 shows the communications that occur within the system when a virtual asset from a first sub-account is sent to a second sub-account in accordance with illustrative embodiments of the present invention.

FIG. 16 shows the communications that occur within the system 1600 when a virtual asset from a first sub-account 1612 is sent to a second sub-account 1614. The sub-accounts 1612, 1614 are associated with different user accounts 1618, 1620 within the system 1600 for the different virtual assets. A first user, having a first user account 1618, may transfer virtual USD from a virtual USD sub-account 1612 to a second user, having a second user account 1620. The second user account 1620 may have a receiving sub-account 1614 denominated in virtual Yen. To request the transaction, the first user may access the Bit reserve network from the client device 1610 in communication with the user interface server 1603. On the user interface, the first user may send virtual dollars to a receiving sub-account 1614 by entering the destination address 1615 of the Yen sub-account 1614 and the amount of the transfer. The user interface server 1603 directly or through another server may communicate with external exchange 1616 to obtain an exchange rate. The exchange rate is displayed to the user for dollars-to-yen, and the user may confirm the transaction.

Once the request is submitted through the user interface server 1603, the account database server 1605 is updated. Specifically, data is updated to indicate that the obligations of the system to the sending sub-account 1613 are reduced by the transferred dollar amount. Additionally, data relating to the receiving sub-account 1614 is updated to indicate that the obligations of the system to the receiving sub-account 1614 are increased by the exchanged yen amount. Because the sending sub-account 1612 derived its value from an initial verified cryptocurrency input (as every sub-account in the system does), the transaction between users is instantaneous. The transaction (transfer of virtual assets from dollars to yen) is sent to the reserve processing server 1606 to be pooled with the other transactions. This transaction will be included in the pool of transactions when the global rebalancing occurs.

It should be recognized by one of ordinary skill in the art that the presented examples that include specific virtual assets and defined user accounts and sub-accounts are merely exemplary and not meant to be limiting and that other transactions may occur between external accounts and internal user sub-accounts and between sub-accounts without deviating from the intended scope of the invention as claimed.

The present invention may be embodied in many different forms, including, but in no way limited to, computer program logic for use with one or more processors (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What I claim is:

1. A method for improving efficiency of blockchain-based transactions originating from accounts without sufficient cryptocurrency assets by requiring fewer operations on a blockchain, the method comprising:

receiving, by a cryptocurrency account server associated with a cryptocurrency transfer service system, a request from a networked device of a first user for transfer of an amount of a cryptocurrency from a sub-account of an account of the first user within a plurality of users each having an account associated with the cryptocurrency transfer service system to a second user not included within the plurality of users, the cryptocurrency transfer service system having a reserve of assets associated with virtual assets held by the plurality of users and an intermediary pool of cryptocurrency;

determining, by the cryptocurrency account server, that the sub-account of the account is denominated by a virtual asset other than the cryptocurrency;

executing, by the cryptocurrency account server, a transfer of the cryptocurrency amount from the intermediary pool of cryptocurrency to a second account associated with the second user based on determining the sub-account is denominated by the virtual asset other than the cryptocurrency, the transfer of the cryptocurrency amount from the intermediary pool of cryptocurrency to the second account being executed such that it is reflected on a decentralized public ledger;

updating, by a user account database server associated with the cryptocurrency transfer service system, the account by debiting a virtual asset corresponding to the cryptocurrency amount from the sub-account;

determining, by a transaction engine associated with the cryptocurrency transfer service system, whether the intermediary pool has reached a predefined threshold; and in response to determining that the intermediary pool has reached the predefined threshold:

exchanging, by the transaction engine, at least one asset held by the reserve for a second amount of cryptocurrency at an external exchange; and transferring, by the transaction engine, the second amount of cryptocurrency from the reserve to the intermediary pool.

2. The method of claim 1, further comprising:

executing, by a reserve processing server, a reserve rebalancing process to cause assets held within the reserve to reflect an aggregate of virtual assets associated with the plurality of users and an updated virtual asset of the first user.

3. The method of claim 2, wherein the reserve processing server performs the rebalancing by buying and selling assets or cryptocurrency at one or more external exchanges and returning proceeds to the reserve.

4. The method of claim 2, wherein the rebalancing is executed after a defined time period.

5. The method of claim 1, wherein at least one cryptocurrency denominated sub-account of the plurality of users has a private key controlled by the cryptocurrency transfer service system.

6. The method of claim 1, wherein the decentralized public ledger associated with the cryptocurrency amount identifies a transfer of cryptocurrency from the intermediary pool to the second user.

7. The method of claim 1, wherein the reserve comprises at least one of a fiat currency, securities and commodities, or assets corresponding to precious metals held in an external account.

8. The method of claim 1, wherein the sub-account is denominated by fiat currency, securities and commodities, or assets corresponding to precious metals.

9. A computer system for improving efficiency of block-chain-based transactions originating from accounts without sufficient cryptocurrency assets by requiring fewer operations on a blockchain, the system comprising:

a cryptocurrency account server, the cryptocurrency account server comprising:

a first processor;

a first memory that stores first computer readable instructions when executed by the first processor cause the first processor to perform operations to:

receive a request from a networked device of a first user for transfer of an amount of a cryptocurrency from a sub-account of an account of the first user within a plurality of users each having an account associated with the cryptocurrency transfer service system to a second user not included within the plurality of users, the cryptocurrency transfer service system having a reserve of assets associated with virtual assets held by the plurality of users and an intermediary pool of cryptocurrency that comprises at least a threshold amount of the cryptocurrency and is separate from the reserve;

determine that the sub-account of the account is denominated by a virtual asset other than the cryptocurrency;

execute a transfer of the cryptocurrency amount from the intermediary pool of cryptocurrency to a second account associated with the second user based on determining the sub-account is denominated by the virtual asset other than the cryptocurrency, the transfer of the cryptocurrency amount from the intermediary pool of cryptocurrency to the second account being executed such that it is reflected on a decentralized public ledger;

a user account database server, the user account database server comprising:

a second processor;

a second memory that stores second computer readable instructions when executed by the second processor cause the second processor to perform operations to:

update the account by debiting a virtual asset corresponding to at least a part of the cryptocurrency amount from the sub-account;

a transaction engine, the transaction engine comprising:

a third processor;

a third memory that stores third computer readable instructions when executed by the third processor cause the third processor to perform operations to:

determining whether the intermediary pool has reached a predefined threshold;

in response to determining that the intermediary pool has reached the predefined threshold:

exchange at least one asset held by the reserve for a second amount of cryptocurrency at an external exchange; and transfer the second amount of cryptocurrency from the reserve to the intermediary pool.

10. The computer system of claim 9, wherein the user account database server is further configured to execute a reserve rebalancing process to cause assets held within the reserve to reflect an aggregate of virtual assets associated with the plurality of users and an updated virtual asset of the first user.

11. The computer system of claim 10, wherein the cryptocurrency account server performs the rebalancing by buying and selling assets or cryptocurrency at one or more external exchanges and returning proceeds to the reserve.

12. The computer system of claim 10, wherein the rebalancing is executed after a defined time period.

13. The computer system of claim 9, wherein at least one cryptocurrency denominated sub-account of the plurality of users has a private key controlled by the cryptocurrency transfer service system.

14. The computer system of claim 9, wherein the decentralized public ledger associated with the cryptocurrency amount identifies a transfer of cryptocurrency from the intermediary pool to the second user.

15. The computer system of claim 9, wherein the reserve comprises at least one of a fiat currency, securities and commodities, or assets corresponding to precious metals held in an external account.

16. The computer system of claim 9, wherein the sub-account is denominated by fiat currency, securities and commodities, or assets corresponding to precious metals.

* * * * *